(12) United States Patent
Xu et al.

(10) Patent No.: US 11,770,809 B2
(45) Date of Patent: Sep. 26, 2023

(54) MIMO ANTENNA ARRAY FOR CROSS DIVISION DUPLEX

(71) Applicant: Samsung Electronics Co., Ltd., Suwon-si (KR)

(72) Inventors: Gary Xu, Allen, TX (US); Khurram Muhammad, Southlake, TX (US); Jin Yuan, Richardson, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/107,567

(22) Filed: Nov. 30, 2020

(65) Prior Publication Data
US 2022/0030570 A1    Jan. 27, 2022

Related U.S. Application Data

(60) Provisional application No. 63/055,068, filed on Jul. 22, 2020.

(51) Int. Cl.
*H04W 72/04*    (2023.01)
*H04W 72/044*    (2023.01)
(Continued)

(52) U.S. Cl.
CPC ........ *H04W 72/044* (2013.01); *H04B 7/0452* (2013.01); *H04B 7/0874* (2013.01); *H04L 5/0051* (2013.01); *H04W 88/06* (2013.01)

(58) Field of Classification Search
CPC ... H04W 72/044; H04W 88/06; H04W 52/02; H04W 74/02; H04W 76/28; H04B 7/0452; H04B 7/0874; H04B 1/406; H04L 5/0051
See application file for complete search history.

(56) References Cited

U.S. PATENT DOCUMENTS 8,830,910 B2    9/2014   Skarp
2011/0292854 A1*    12/2011   Terry ............... H04L 5/0098
                                                  370/329
(Continued)

FOREIGN PATENT DOCUMENTS

KR    10-2017-0113225 A    10/2017
WO    2018013238 A1    1/2018
(Continued)

OTHER PUBLICATIONS

International Search Report and Written Opinion of the International Searching Authority dated Nov. 12, 2021, in connection with International Application No. PCT/KR2021/009465, 8 pages.

*Primary Examiner* — Ian N Moore
*Assistant Examiner* — Latresa A McCallum

(57) ABSTRACT

A radio frequency (RF) unit and method of operation of the RF unit are disclosed herein. The RF unit comprises an antenna array, and the antenna array comprises a plurality of antenna elements. A first set of the plurality of antenna elements is configured to operate in a first mode and a second set of the plurality of antenna elements is configured to operate in a second mode. In the first mode, the first set of the plurality of antenna elements is configured to transmit and receive. In the second mode, the second set of the plurality of antenna elements is configured to only receive.

18 Claims, 19 Drawing Sheets

(51) Int. Cl.
  *H04B 7/08*    (2006.01)
  *H04L 5/00*    (2006.01)
  *H04B 7/0452*  (2017.01)
  *H04W 88/06*   (2009.01)

(56) References Cited

U.S. PATENT DOCUMENTS

2012/0201163 A1* 8/2012 Jongren ................ H04L 5/0035
                                                  370/252
2014/0329557 A1* 11/2014 Van der Velde ...... H04W 48/16
                                                  455/552.1
2017/0331670 A1* 11/2017 Parkvall ............... H04J 11/0059
2018/0092085 A1*  3/2018 Shaheen ............... H04W 76/16
2018/0279274 A1*  9/2018 Sun ....................... H04W 72/04
2018/0309619 A1  10/2018 Hall et al.
2019/0013570 A1   1/2019 Caballero et al.
2019/0132035 A1*  5/2019 McMorrow .......... H04B 7/0617
2019/0356057 A1  11/2019 Carey et al.

FOREIGN PATENT DOCUMENTS

WO       2020122775  A1    6/2020
WO    WO-2021168144 A1 *  8/2021

* cited by examiner

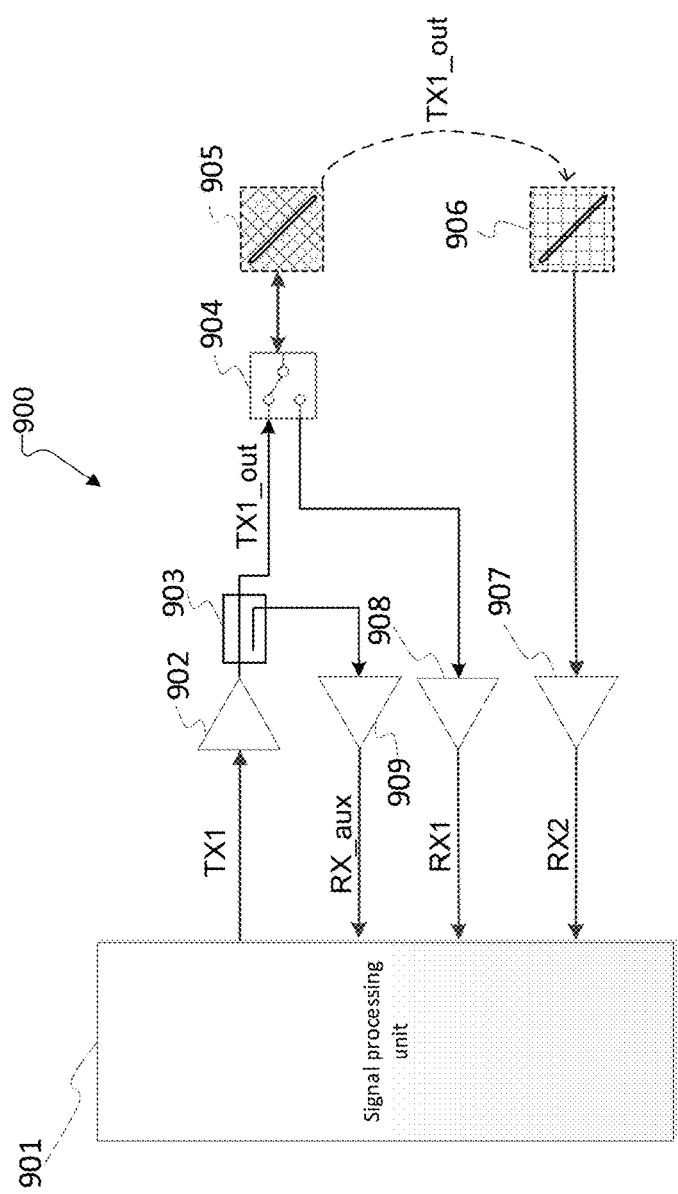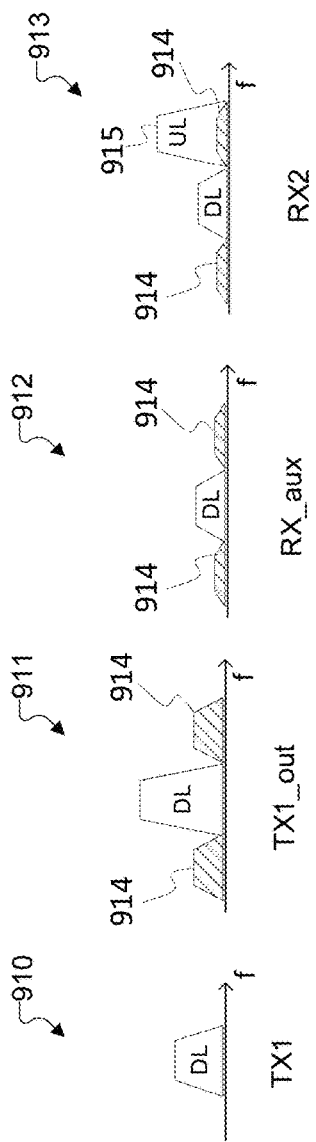
FIG. 9A
FIG. 9B

MIMO ANTENNA ARRAY FOR CROSS DIVISION DUPLEX

CROSS-REFERENCE TO RELATED APPLICATION(S) AND CLAIM OF PRIORITY

This application claims priority under 35 U.S.C. § 119(e) to U.S. Provisional Patent Application No. 63/055,068 filed on Jul. 22, 2020. The above-identified provisional patent application is hereby incorporated by reference in its entirety.

TECHNICAL FIELD

This disclosure relates generally to self-interference radio antenna systems. More specifically, this disclosure relates to a massive multiple-input multiple-output (MIMO) array that supports simultaneous transmission and reception of signals within time division duplex (TDD) frequency bands.

BACKGROUND

Limited coverage has been identified as one of the key challenges of 5G cellular communication systems. Many of the 5G bands are at high frequencies compared to 4G bands, which results in higher path loss, and have wider bandwidth compared to 4G bands, which results in lower power spectral density (PSD). These factors compromise the transmission range of the wireless link between 5G devices. Therefore, cell edge users typically have to be allocated with less than the full bandwidth of the spectrum in order to boost the signal-to-noise ratio (SNR) at the base station (BS) for better reception.

Furthermore, most of the 5G bands are allocated as time division duplex (TDD) bands. Although TDD bands have the benefit of flexibly allocating downlink (DL) and uplink (UL) resources in the time domain, the UL resource allocation is inevitably smaller than that of frequency division duplex (FDD) systems. The limited time and limited spectrum that a user equipment (UE) is allocated for UL transmission are the main reasons for the coverage range limitation of 5G systems.

SUMMARY

Embodiments of the present disclosure provide a radio frequency (RF) unit. The RF unit comprises an antenna array, and the antenna array comprises a plurality of antenna elements. A first set of the plurality of antenna elements is configured to operate in a first mode and a second set of the plurality of antenna elements is configured to operate in a second mode. In the first mode, the first set of the plurality of antenna elements is configured to transmit and receive. In the second mode, the second set of the plurality of antenna elements is configured to only receive.

In another embodiment of the above RF unit, the second set of the plurality of antenna elements is further configured to operate in the first mode, and in the first mode, the second set of the plurality of antenna elements is configured to only receive. At least some of the plurality of antenna elements can comprise a plurality of antennas arranged in a sub-array configuration. The first set of the plurality of antenna elements can comprise a massive multiple-input multiple-output (MIMO) array, and the antenna elements comprising the second set of the plurality of antenna elements can be disposed adjacent to at least one edge of the massive MIMO array. The RF unit can further comprise an electromagnetic (EM) isolation element disposed between the first set of the plurality of antenna elements and the second set of the plurality of antenna elements.

In yet another embodiment of the above RF unit, the first set of the plurality of antenna elements is further configured to operate in the second mode. In the second mode, the first set of the plurality of antenna elements is configured to only transmit, and the second set of the plurality of antenna elements is configured to receive in a same time slot in which the first set of the plurality of antenna elements transmits. The first set of the plurality of antenna elements can further be configured to, in the first mode, receive a sounding reference signal (SRS) in a first time slot, and in the second mode, transmit in a second time slot a beamformed signal that is based on the received SRS. In the second mode, the first set of the plurality of antenna elements is configured to transmit in a first frequency allocation, the second set of the plurality of antenna elements is configured to receive in a second frequency allocation, and the first frequency allocation and the second frequency allocation are either overlapping or non-overlapping. The first frequency allocation and the second frequency allocation comprise a third frequency allocation, and in the first mode, the first set of the plurality of antenna elements is configured to transmit and receive in the third frequency allocation. A size of the first frequency allocation and a size of the second frequency allocation are dynamic between time slots.

In one embodiment, a method of operation of an RF unit is provided. The method includes transmitting and receiving, in a first mode, first transmit and first receive signals via a first set of a plurality of antenna elements of an antenna array of the RF unit, and receiving, in a second mode, second receive signals via a second set of the plurality of antenna elements of the antenna array of the RF unit.

In another embodiment of the above method of the RF unit, the method includes receiving, in the first mode, at least some of the first receive signals via the second set of the plurality of antenna elements. The above method of the RF unit can further include transmitting, in the second mode, second transmit signals via the first set of the plurality of antenna elements, and receiving, in the second mode, the second receive signals via the second set of the plurality of antenna elements in a same time slot in which the first set of the plurality of antenna elements transmits the second transmit signals. In some embodiments, the method further includes receiving, via the first set of the plurality of antenna elements, in the first mode, a sounding reference signal (SRS) in a first time slot, and transmitting, via the first set of the plurality of antenna elements, in the second mode, in a second time slot, a beamformed signal that is based on the received SRS. In some embodiments, the second transmit signals are transmitted in a first frequency allocation, and the second receive signals are received in a second frequency allocation, wherein the first frequency allocation and the second frequency allocation are either overlapping or non-overlapping. In some embodiments, the first frequency allocation and the second frequency allocation comprise a third frequency allocation, and the method further includes transmitting and receiving, in the first mode, the first transmit and receive signals via the first set of the plurality of antenna elements in the third frequency allocation. In some embodiments, a size of the first frequency allocation and a size of the second frequency allocation are dynamic between time slots.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A illustrates a block diagram of an example XDD operation according to embodiments of the present disclosure;

FIG. 9B illustrates example frequency spectrum diagrams of signals at various points in the XDD operation of FIG. 9A;

DETAILED DESCRIPTION

Figure 1A:
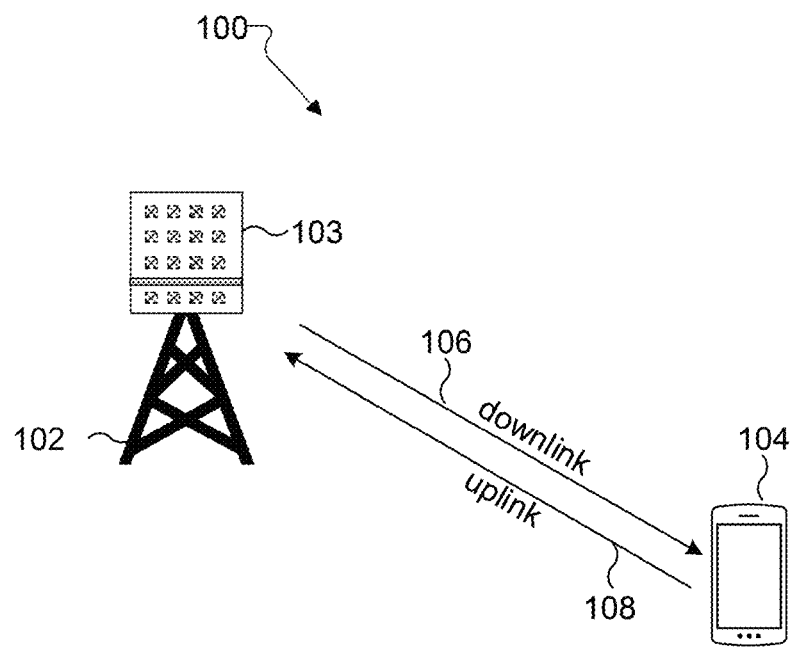
FIG. 1A illustrates an exemplary wireless system, which operates according to the principles of the present disclosure.

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that enhancing the UL coverage (i.e., the range in which UL transmissions from a UE can be received by a BS) of TDD carriers without sacrificing DL data throughput would be beneficial. To address this issue, embodiments of the present disclosure recognize that cross division duplex (XDD) allows a UE to transmit a UL signal while the BS transmits the DL signal at the same time, within the spectrum of the same TDD frequency band. As compared to TDD systems, the UE's uplink can be scheduled with more opportunities in both the time and frequency domains, and therefore the coverage can be extended compared to the TDD systems.

Embodiments of the present disclosure recognize that TDD is typically performed using massive multiple-input multiple-output (MIMO) antenna arrays. These massive MIMO arrays are comprised of common TX and RX antenna elements which perform both DL TX and UL RX operations. To facilitate XDD operation, embodiments of the present disclosure introduce dedicated RX antenna elements to a massive MIMO antenna array. These dedicated RX antenna elements can be disposed in a number of configurations adjacent to the common TX and RX antenna elements. The resulting XDD massive MIMO antenna array is capable of operating in both TDD and XDD modes.

In TDD mode, the common TX and RX antenna elements can perform DL TX and UL RX operations while the dedicated RX antenna elements either assist with UL RX operations or remain dormant. In XDD mode, the common TX and RX antenna elements perform only DL TX operations in a first frequency allocation (i.e., a DL allocation) while the dedicated RX antenna elements simultaneously perform only UL RX operations in a second frequency allocation (i.e., a UL allocation). The UL allocation and the DL allocation are both within a TDD band (for example, the TDD band used by the massive MIMO array for TDD mode).

Embodiments of the present disclosure also recognize that, in XDD operation, the UL signal is received at the BS in a frequency allocation (i.e., the UL allocation) that can be adjacent to the frequency allocation used to transmit the DL signal (i.e., the DL allocation). This is due to the sharing of the TDD band for both UL allocation and DL allocation. The power amplifier (PA) in the BS that is used to generate the DL signal is not ideal and exhibits nonlinear behavior. This causes spillover of spectral energy outside of DL allocation into the UL allocation. This spillover energy is also called transmitter (TX) leakage, and is dominantly due to PA nonlinearity. This spillover energy falls into the adjacent UL allocation due to antenna coupling even though the TX and RX processes may use independent antennas in a multiple-input multiple-output (MIMO) antenna array. The DL TX leakage reduces the sensitivity of the UL receiver.

Embodiments of the present disclosure recognize that one solution to this problem is to physically space the TX and RX antennas apart. When TX and RX antennas are physically spaced apart, sufficient isolation between TX and RX signal chains can be obtained to reduce the DL TX leakage in the UL RX band by enough that the UL receiver's sensitivity is substantially unaffected. However, providing spacing between the TX and RX antennas such that the TX-RX coupling is sufficiently low increases the size and weight of the BS. In a massive MIMO TDD system this is not practical. First, providing separate TX and RX antenna arrays doubles the size of the hardware system, which increases the cost and deployment cost (e.g., wind load, etc.) of the BS. Second, a separate TX and RX antenna array arrangement violates the reciprocity property of DL and UL operation in TDD. Therefore, it reduces the DL multi-user MIMO (MU-MIMO) performance.

Embodiments of the present disclosure recognize that another solution is to sample the DL TX signal at the transmitter and use that sample to generate a cancelation signal that can be used to cancel TX leakage out of the UL RX signal. Embodiments of the present disclosure recognize that a further solution to the problem of TX leakage is to introduce electromagnetic (EM) isolation hardware between antennas that perform TX and RX in XDD operation.

FIG. 1A illustrates an exemplary wireless system 100, which operates according to the principles of the present disclosure. In the illustrated embodiment, wireless system 100 includes a transmission point (e.g., an Evolved Node B (eNB), Node B), such as base station (BS) 102. BS 102 may be in communication with other base stations and with the Internet or a similar IP-based system (not shown). BS 102 has a XDD massive MIMO antenna array 103. BS 102 provides wireless cellular access (for example, broadband access to the Internet) to a user equipment (UE) 104 (e.g., mobile phone, mobile station, or subscriber station) within a coverage area of BS 102.

UE 104 may access voice, data, video, video conferencing, and/or other broadband services via the Internet. UE 104 may be associated with an access point (AP) of a WiFi WLAN. UE 104 may be any of a number of mobile devices, including a wireless-enabled laptop computer, wireless-enabled personal computer, personal data assistant, notebook, handheld device, or other wireless-enabled device. While only one base station and one user equipment are depicted in FIG. 1A, it is understood that wireless system 100 may provide wireless broadband access to additional user equipment.

In this embodiment, wireless system 100 can operate using time division duplex (TDD) or cross division duplex (XDD). In TDD operation (also referred to as TDD mode), there is one shared frequency band, or channel, allocated for both downlink (DL) and uplink (UL) communications. In XDD operation (also referred to as XDD mode), two separate portions of frequency spectrum are allocated for DL and UL communications. In particular, DL spectrum 106 (or DL allocation 106) is assigned for DL communications, and UL spectrum 108 (or UL allocation 108) is assigned for UL communications. DL spectrum 106 and UL spectrum 108 are both within the same frequency band used for the TDD mode (i.e., a TDD band). From the perspective of the BS 102, DL communications are transmitted signals, and UL communications are received signals. From the perspective of the UE 104, DL communications are received signals, and UL communications are transmitted signals.

Figure 1B:
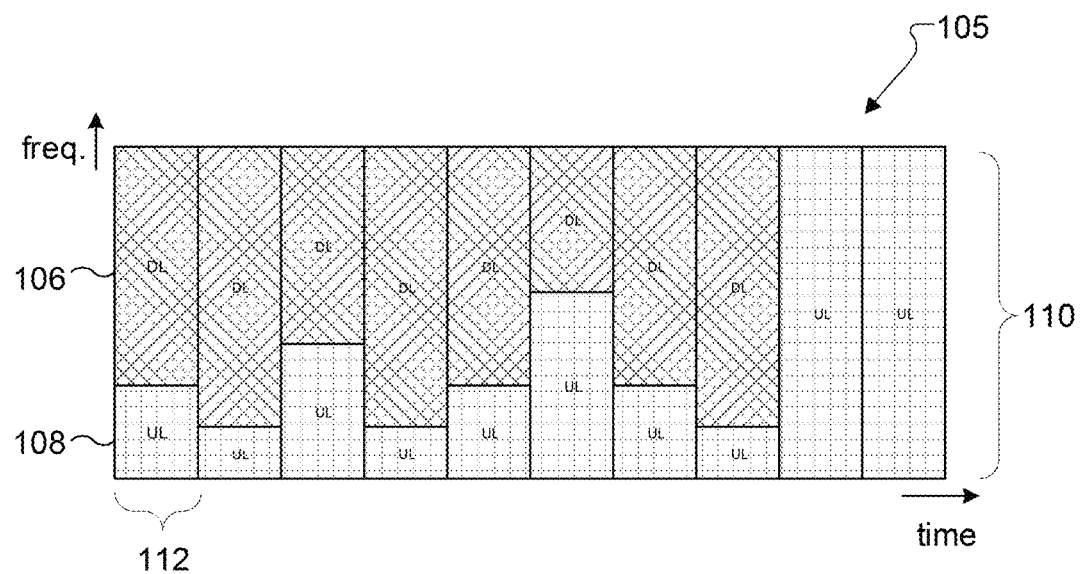
FIG. 1B illustrates an example spectrum diagram of an example of cross division duplex (XDD) mode operations performed by the wireless system of FIG. 1A.

FIG. 1B illustrates an example spectrum diagram 105 of an example of XDD mode operations performed by the wireless system 100 of FIG. 1A. In this embodiment, DL spectrum 106 and UL spectrum 108 are adjacent to each other within the shared TDD band 110. As a result, there is significant leakage of transmission (TX) power from the DL spectrum 106 into the receive (RX) spectrum, UL spectrum 108, as transmission power at the point of transmission is significantly higher than reception power at the point of reception. Furthermore, the RX process of the BS 102 is typically highly sensitive, as it is designed to receive UL transmissions from mobile UEs, which are in turn designed to operate efficiently on battery power, resulting in relatively low power UL signals arriving at the BS 102.

In some embodiments, a frequency gap (not shown) can be allocated between the DL spectrum 106 and UL spectrum 108. This could serve to reduce TX leakage into the RX spectrum. In other embodiments, the allocated DL spectrum 106 and UL spectrum 108 could overlap. This may be the case, for example, in integrated access and backhaul (IAB) and full duplex systems.

In some embodiments, the size of DL spectrum 106 and UL spectrum 108 can be dynamically configured across each time slot 112. This configuration can be based on the amount of information that is ready for transmission in the DL and UL during a given time slot 112. It is possible for a time slot 112 to be entirely dedicated to only DL spectrum 106 or only UL spectrum 108.

Although FIG. 1A illustrates one example of a wireless system 100, various changes may be made to FIG. 1A. For example, the wireless system 100 could include any number of UEs 104, and could be integrated with other BSs 102.

Figure 2:
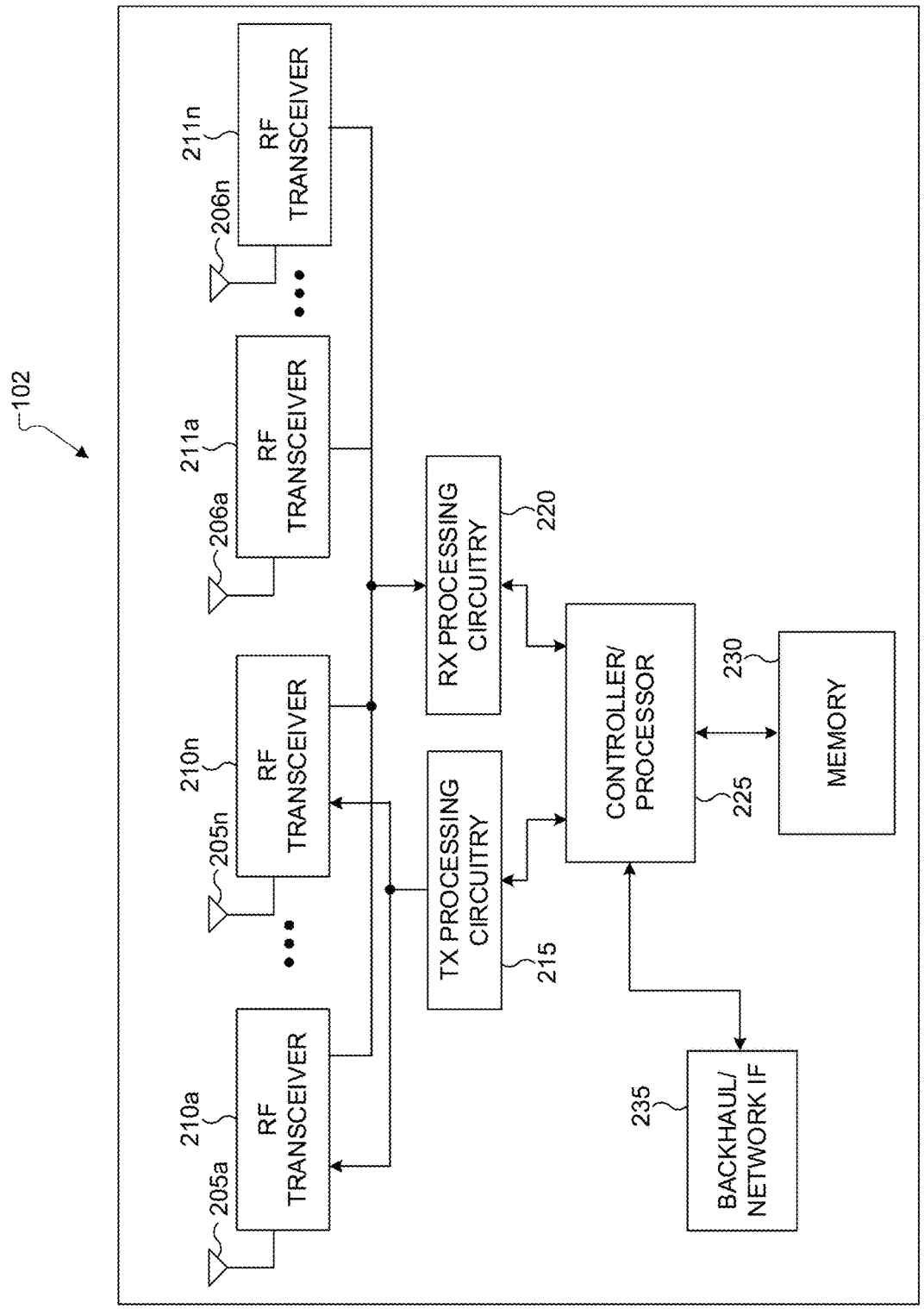
FIG. 2 illustrates an example base station (BS) according to embodiments of the present disclosure.

FIG. 2 illustrates an example BS 102 according to embodiments of the present disclosure. The embodiment of the BS 102 illustrated in FIG. 2 is for illustration only, and the BS 102 of FIG. 1A could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n and 206a-206n, multiple RF transceivers 210a-210n and 211a-211n, transmit (TX) processing circuitry 215, and receive (RX) processing circuitry 220. The BS 102 also includes a controller/processor 225, a memory 230, and a backhaul or network interface 235.

The multiple antennas 205a-205n and 206a-206n comprise the XDD massive MIMO antenna array 103. In some embodiments, the multiple antennas 205a-205n comprise an array of common TX and RX antennas for massive MIMO operation, and the multiple antennas 206a-206n comprise dedicated RX antennas for UL RX operation. As described further below with respect to FIGS. 3A-8B, the antennas 206a-206n can be arranged in various positions relative to the array of antennas 205a-205n.

The common TX and RX antennas 205a-205n can perform both DL TX operations and UL RX operations during TDD mode, and can perform DL TX operations during XDD mode. The dedicated RX antennas 206a-206n can perform UL RX operations only during XDD mode, or they can perform UL RX operations during both XDD mode and TDD mode. In the latter case, both the common TX and RX antennas 205a-205n and the dedicated RX antennas 206a-206n perform the UL RX operations during TDD mode.

The RF transceivers 210a-210n receive, from the antennas 205a-205n during TDD mode, incoming RF signals, such as signals transmitted by UE 104 or other UEs in the wireless system 100. Likewise, the RF transceivers 211a-211n receive, from the antennas 206a-206n during XDD mode or TDD mode, such incoming RF signals. The RF transceivers 210a-210n and 211a-211n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. During both TDD mode and XDD mode, the RF transceivers 210a-210n receive the outgoing processed baseband or IF signals from the TX processing circuitry 215 and up-convert the baseband or IF signals to outgoing RF signals that are transmitted via the antennas 205a-205n.

The controller/processor 225 can include one or more processors or other processing devices that control the overall operation of the BS 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 can perform interference cancelation processes to isolate the incoming RF signals from the outgoing RF signals in XDD mode. In some embodiments, the interference cancelation processes are self-interference cancelation (SIC) processes.

In some embodiments, the RF transceivers 210a-210n or the RX processing circuitry 220 perform this interference cancelation process. The interference cancelation process can be implemented using dedicated hardware, such as an application-specific integrated circuit (ASIC) or a field-programmable gate array (FPGA). The ASIC can be a radio frequency ASIC (RF ASIC).

The controller/processor 225 could support additional functions as well, such as more advanced wireless communication functions. For instance, the controller/processor 225 could support beamforming or directional routing operations in which outgoing signals from multiple antennas 205a-205n are weighted differently to effectively steer the outgoing signals in a desired direction. Any of a wide variety of other functions could be supported in the BS 102 by the controller/processor 225.

The controller/processor 225 is also capable of executing programs and other processes resident in the memory 230, such as an operating system (OS). The controller/processor 225 can move data into or out of the memory 230 as required by an executing process.

The controller/processor 225 is also coupled to the backhaul or network interface 235. The backhaul or network interface 235 allows the BS 102 to communicate with other devices or systems over a backhaul connection or over a network. The interface 235 could support communications over any suitable wired or wireless connection(s). For example, when the BS 102 is implemented as part of a cellular communication system (such as one supporting 5G, LTE, or LTE-A), the interface 235 could allow the BS 102 to communicate with other BSs over a wired or wireless backhaul connection. When the BS 102 is implemented as an access point, the interface 235 could allow the BS 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a random access memory (RAM), and another part of the memory 230 could include a Flash memory or other read-only memory (ROM).

Although FIG. 2 illustrates one example of a BS 102, various changes may be made to FIG. 2. For example, the BS 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIGS. 3A-8B illustrate different embodiments of an example XDD massive MIMO antenna array 103 according to embodiments of the present disclosure. In these embodiments, the XDD massive MIMO antenna array 103 could be implemented in a BS 102 of FIGS. 1A and 2. In particular, FIGS. 3A-8B illustrate different arrangements for physical placement of dedicated RX antennas 206a-206n relative to the antennas 205a-205n that comprise the array of common TX and RX antennas for massive MIMO operation, as described above with respect to FIG. 2.

Figure 3A:
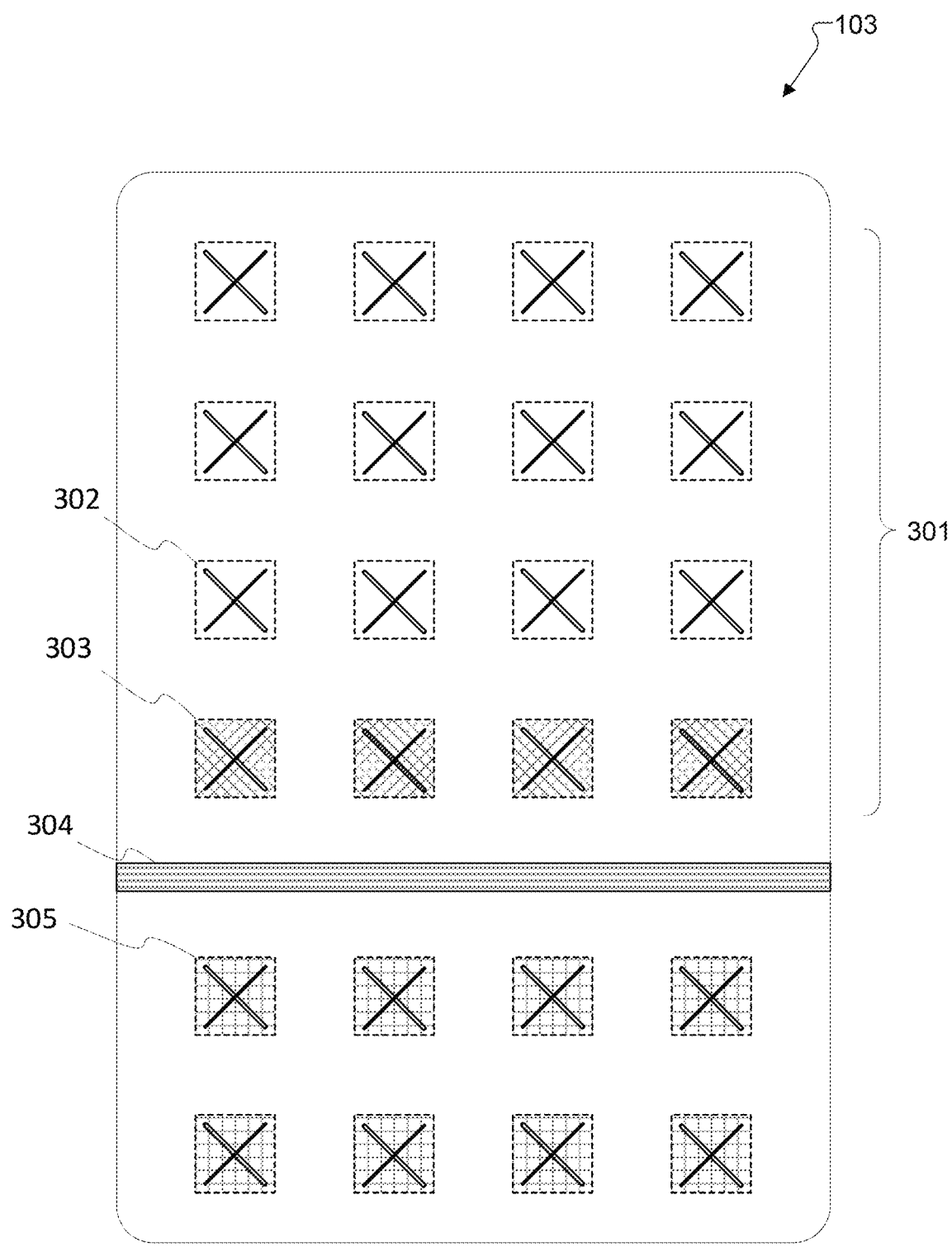
FIGS. 3A-8B illustrate different embodiments of an example XDD massive MIMO antenna array according to embodiments of the present disclosure.

FIG. 3A illustrates a block diagram of an example XDD massive MIMO antenna array 103 according to embodiments of the present disclosure. In this embodiment, dedicated RX antennas, such as antennas 206a-206n of FIG. 2, are placed below an existing antenna array of common TX and RX antennas, such as antennas 205a-205n of FIG. 2. It is understood that a similar arrangement can be created wherein the dedicated RX antennas are placed above or to the left or right of the existing antenna array of common TX and RX antennas illustrated in FIG. 3A.

The antenna array 103 includes multiple common TX and RX antennas 302 and 303, electromagnetic (EM) isolation hardware 304, and multiple dedicated RX antennas 305. The common TX and RX antennas 302 and 303 form an array

301 of common TX and RX antennas for massive MIMO operation. During TDD mode, the common TX and RX antennas 302 and 303 perform both DL TX and UL RX operations in different time slots. During XDD mode, the common TX and RX antennas 302 and 303 only perform DL TX operations.

The dedicated RX antennas 305 perform UL RX operations during XDD mode. In some embodiments, the dedicated RX antennas 305 do not operate during TDD mode, while in other embodiments, the dedicated RX antennas 305 perform UL RX operations during TDD mode alongside the common TX and RX antennas 302 and 303. During XDD mode, the UL RX operations can be performed by the dedicated RX antennas 305 in the same time slots in which the common TX and RX antennas 302 and 303 perform DL TX operations.

The EM isolation hardware 304 provides isolation between the array 301 of common TX and RX antennas and the dedicated RX antennas 305. This at least partially protects the dedicated RX antennas 305 from TX leakage from the common TX and RX antennas 302 and 303 during XDD mode.

As the common TX and RX antennas 303 are the closest antennas of the array 301 to the dedicated RX antennas 305, they are expected to be the largest source of TX leakage during XDD mode. Accordingly, the DL TX signals input to the common TX and RX antennas 303 can be coupled to an interference cancelation process that uses the DL TX signals to generate cancelation signals, which in turn are used to cancel the TX leakage that the common TX and RX antennas 303 cause at dedicated RX antennas 305.

Figure 3B:
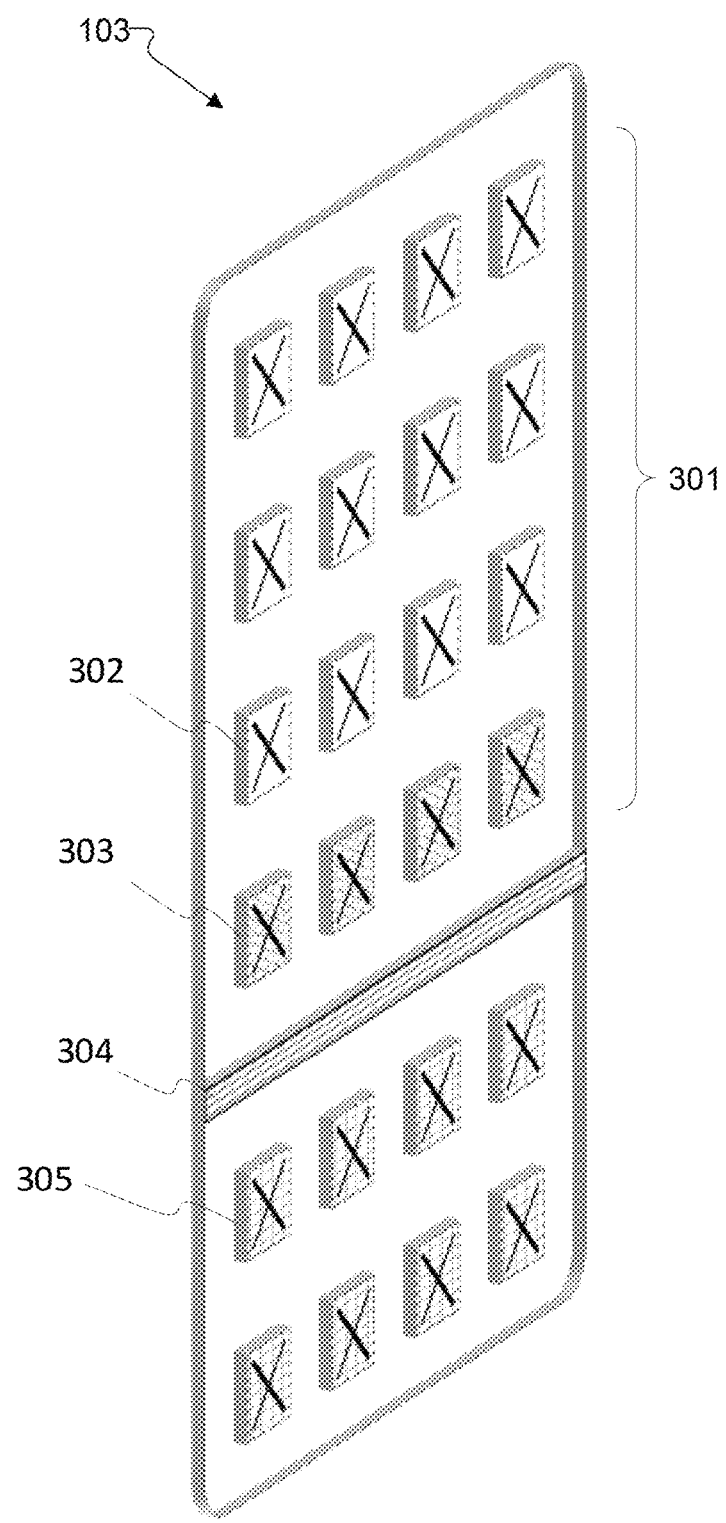

Although FIG. 3A illustrates one example of XDD massive MIMO antenna array 103, various changes may be made to FIG. 3A. For example, various components in FIG. 3A could be combined, further subdivided, or omitted and additional components could be added according to particular needs. FIG. 3B is a rotated three-dimensional view of the block diagram of the example XDD massive MIMO antenna array 103 of FIG. 3A.

Figure 3C:
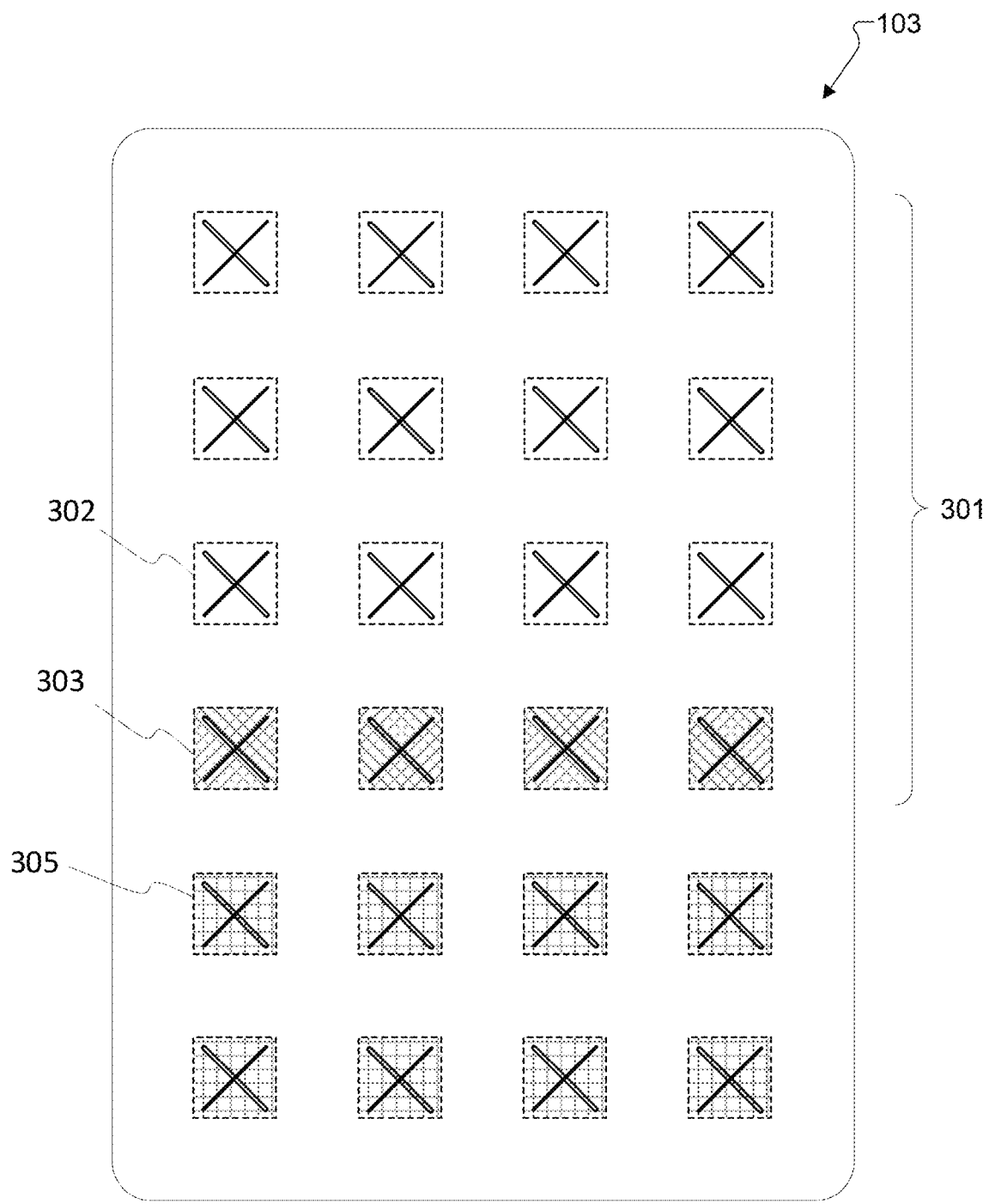

FIG. 3C illustrates a block diagram of an example XDD massive MIMO antenna array 103 according to embodiments of the present disclosure. This embodiment is similar to the embodiment of FIG. 3A, with the exception of the EM isolation hardware 304. In this embodiment, dedicated RX antennas, such as antennas 206a-206n of FIG. 2, are placed below an existing antenna array of common TX and RX antennas, such as antennas 205a-205n of FIG. 2. It is understood that a similar arrangement can be created wherein the dedicated RX antennas are placed above or to the left or right of the existing antenna array of common TX and RX antennas illustrated in FIG. 3C.

The antenna array 103 includes multiple common TX and RX antennas 302 and 303, and multiple dedicated RX antennas 305. The common TX and RX antennas 302 and 303 form an array 301 of common TX and RX antennas for massive MIMO operation. During TDD mode, the common TX and RX antennas 302 and 303 perform both DL TX and UL RX operations in different time slots. During XDD mode, the common TX and RX antennas 302 and 303 only perform DL TX operations.

The dedicated RX antennas 305 perform UL RX operations during XDD mode. In some embodiments, the dedicated RX antennas 305 do not operate during TDD mode, while in other embodiments, the dedicated RX antennas 305 perform UL RX operations during TDD mode alongside the common TX and RX antennas 302 and 303. During XDD mode, the UL RX operations can be performed by the dedicated RX antennas 305 in the same time slots in which the common TX and RX antennas 302 and 303 perform DL TX operations.

As the common TX and RX antennas 303 are the closest antennas of the array 301 to the dedicated RX antennas 305, they are expected to be the largest source of TX leakage during XDD mode. Accordingly, the DL TX signals input to the common TX and RX antennas 303 can be coupled to an interference cancelation process that uses the DL TX signals to generate cancelation signals, which in turn are used to cancel the TX leakage that the common TX and RX antennas 303 cause at dedicated RX antennas 305.

Figure 3D:
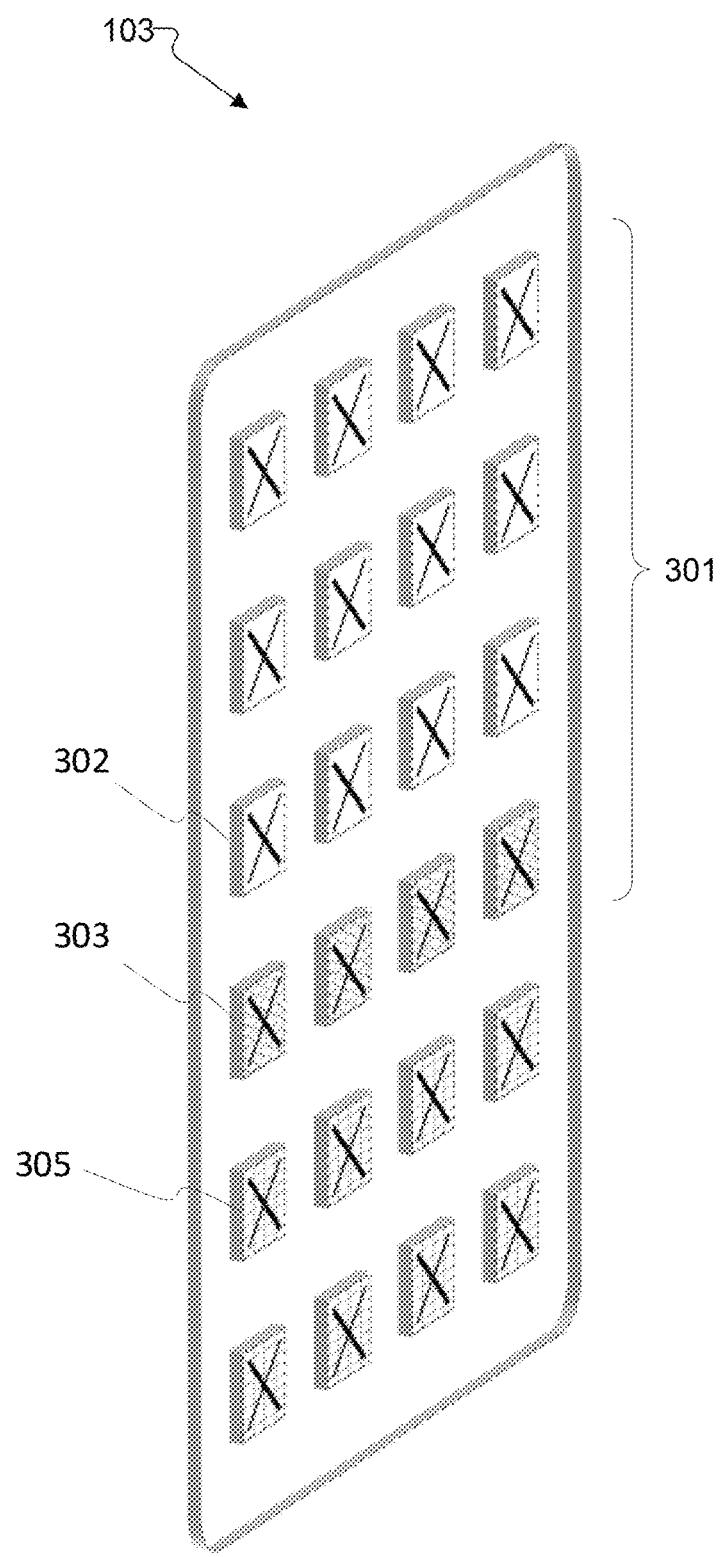

Although FIG. 3C illustrates one example of XDD massive MIMO antenna array 103, various changes may be made to FIG. 3C. For example, various components in FIG. 3C could be combined, further subdivided, or omitted and additional components could be added according to particular needs. FIG. 3D is a rotated three-dimensional view of the block diagram of the example XDD massive MIMO antenna array 103 of FIG. 3C.

Figure 4A:
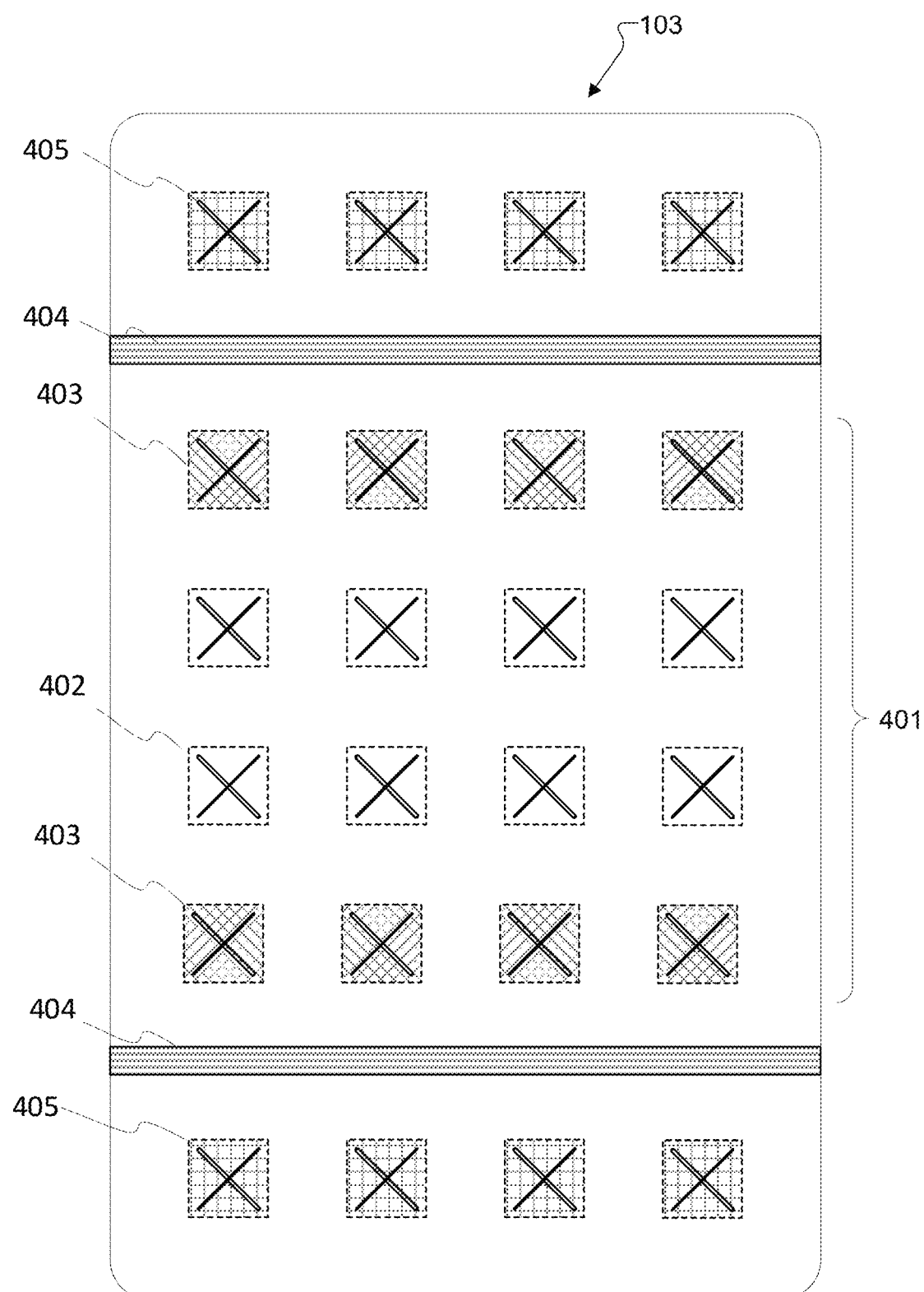

FIG. 4A illustrates a block diagram of an example XDD massive MIMO antenna array 103 according to embodiments of the present disclosure. In this embodiment, dedicated RX antennas, such as antennas 206a-206n of FIG. 2, are placed both above and below an existing antenna array of common TX and RX antennas, such as antennas 205a-205n of FIG. 2.

The antenna array 103 includes multiple common TX and RX antennas 402 and 403, EM isolation hardware 404, and multiple dedicated RX antennas 405. The common TX and RX antennas 402 and 403 form an array 401 of common TX and RX antennas for massive MIMO operation. During TDD mode, the common TX and RX antennas 402 and 403 perform both DL TX and UL RX operations in different time slots. During XDD mode, the common TX and RX antennas 402 and 403 only perform DL TX operations.

The dedicated RX antennas 405 perform UL RX operations during XDD mode. In some embodiments, the dedicated RX antennas 405 do not operate during TDD mode, while in other embodiments, the dedicated RX antennas 405 perform UL RX operations during TDD mode alongside the common TX and RX antennas 402 and 403. During XDD mode, the UL RX operations can be performed by the dedicated RX antennas 405 in the same time slots in which the common TX and RX antennas 402 and 403 perform DL TX operations.

The EM isolation hardware 404 provides isolation between the array 401 of common TX and RX antennas and the dedicated RX antennas 405. This at least partially protects the dedicated RX antennas 405 from TX leakage from the common TX and RX antennas 402 and 403 during XDD mode.

As the common TX and RX antennas 403 are the closest antennas of the array 401 to the dedicated RX antennas 405, they are expected to be the largest source of TX leakage during XDD mode. Accordingly, the DL TX signals input to the common TX and RX antennas 403 can be coupled to an interference cancelation process that uses the DL TX signals to generate cancelation signals, which in turn are used to cancel the TX leakage that the common TX and RX antennas 403 cause at dedicated RX antennas 405.

Figure 4B:
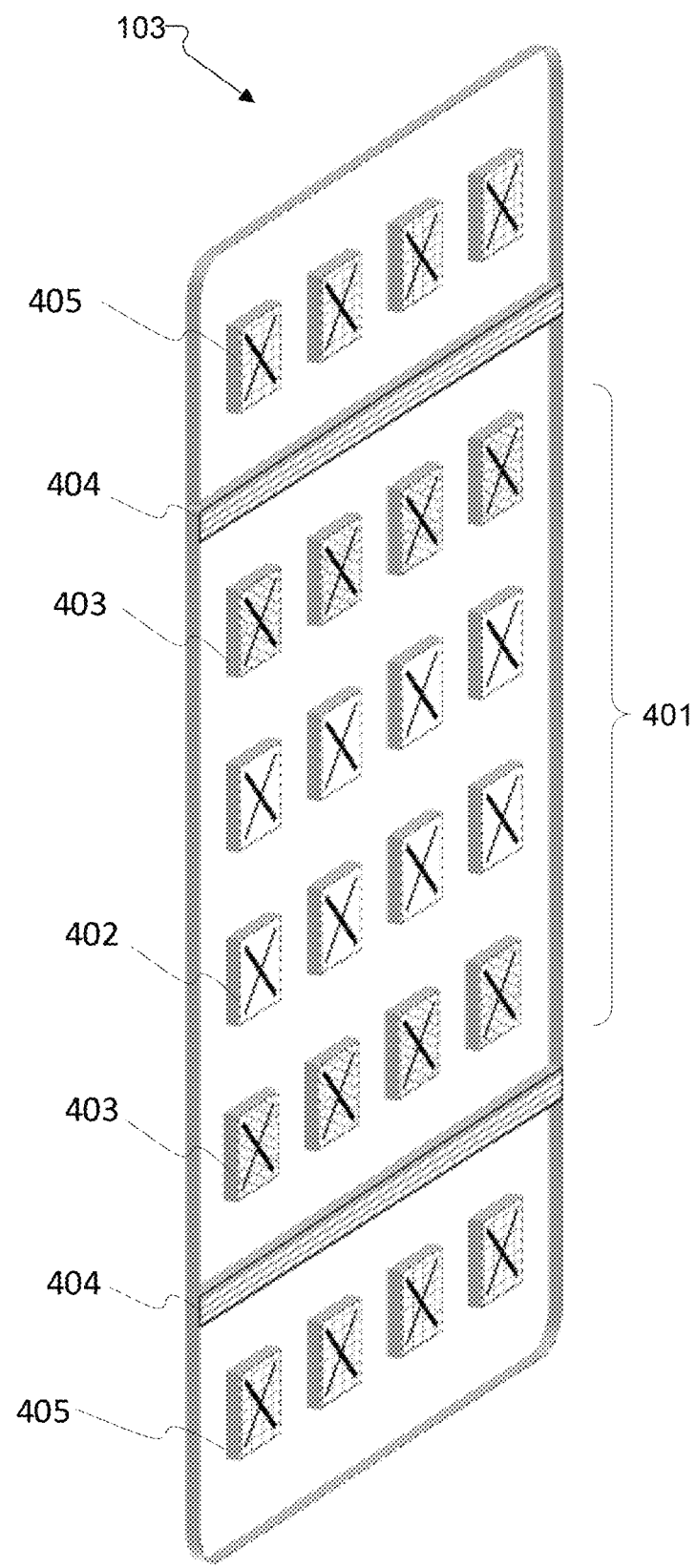

Although FIG. 4A illustrates one example of XDD massive MIMO antenna array 103, various changes may be made to FIG. 4A. For example, various components in FIG. 4A could be combined, further subdivided, or omitted and additional components could be added according to particular needs. FIG. 4B is a rotated three-dimensional view of the block diagram of the example XDD massive MIMO antenna array 103 of FIG. 4A.

Figure 5A:
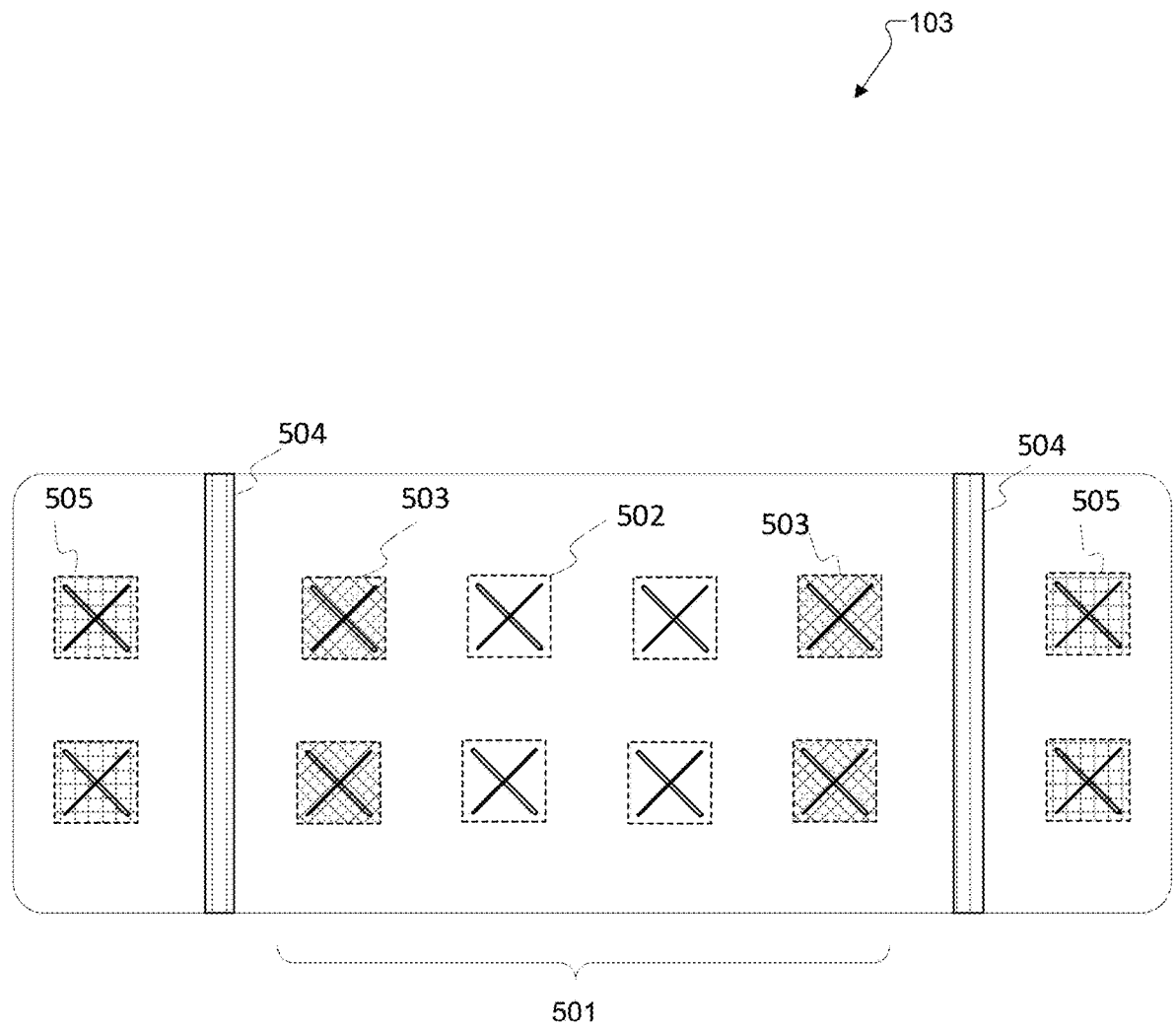

FIG. 5A illustrates a block diagram of an example XDD massive MIMO antenna array 103 according to embodiments of the present disclosure. In this embodiment, dedicated RX antennas, such as antennas 206a-206n of FIG. 2, are placed both to the left and to the right of an existing antenna array of common TX and RX antennas, such as antennas 205a-205n of FIG. 2.

The antenna array 103 includes multiple common TX and RX antennas 502 and 503, EM isolation hardware 504, and multiple dedicated RX antennas 505. The common TX and RX antennas 502 and 503 form an array 501 of common TX and RX antennas for massive MIMO operation. During TDD mode, the common TX and RX antennas 502 and 503 perform both DL TX and UL RX operations in different time slots. During XDD mode, the common TX and RX antennas 502 and 503 only perform DL TX operations.

The dedicated RX antennas 505 perform UL RX operations during XDD mode. In some embodiments, the dedicated RX antennas 505 do not operate during TDD mode, while in other embodiments, the dedicated RX antennas 505 perform UL RX operations during TDD mode alongside the common TX and RX antennas 502 and 503. During XDD mode, the UL RX operations can be performed by the dedicated RX antennas 505 in the same time slots in which the common TX and RX antennas 502 and 503 perform DL TX operations.

The EM isolation hardware 504 provides isolation between the array 501 of common TX and RX antennas and the dedicated RX antennas 505. This at least partially protects the dedicated RX antennas 505 from TX leakage from the common TX and RX antennas 502 and 503 during XDD mode.

As the common TX and RX antennas 503 are the closest antennas of the array 501 to the dedicated RX antennas 505, they are expected to be the largest source of TX leakage during XDD mode. Accordingly, the DL TX signals input to the common TX and RX antennas 503 can be coupled to an interference cancelation process that uses the DL TX signals to generate cancelation signals, which in turn are used to cancel the TX leakage that the common TX and RX antennas 503 cause at dedicated RX antennas 505.

Figure 5B:
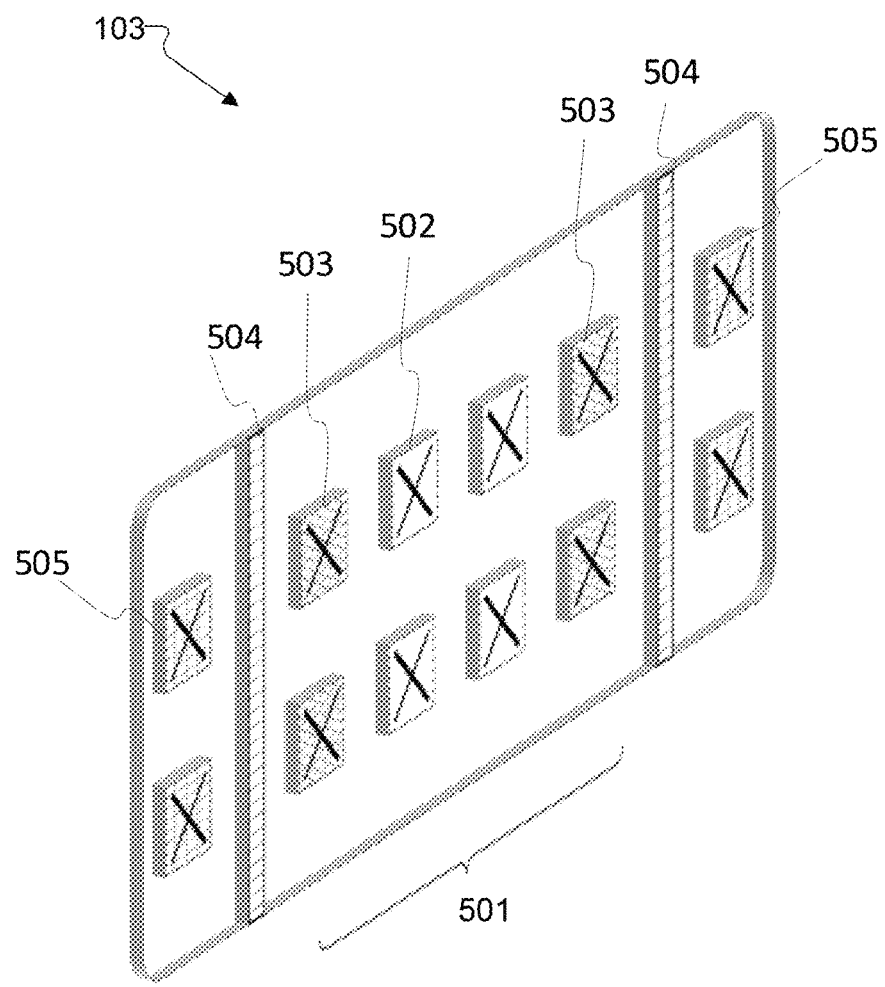

Although FIG. 5A illustrates one example of XDD massive MIMO antenna array 103, various changes may be made to FIG. 5A. For example, various components in FIG. 5A could be combined, further subdivided, or omitted and additional components could be added according to particular needs. FIG. 5B is a rotated three-dimensional view of the block diagram of the example XDD massive MIMO antenna array 103 of FIG. 5A.

Figure 6A:
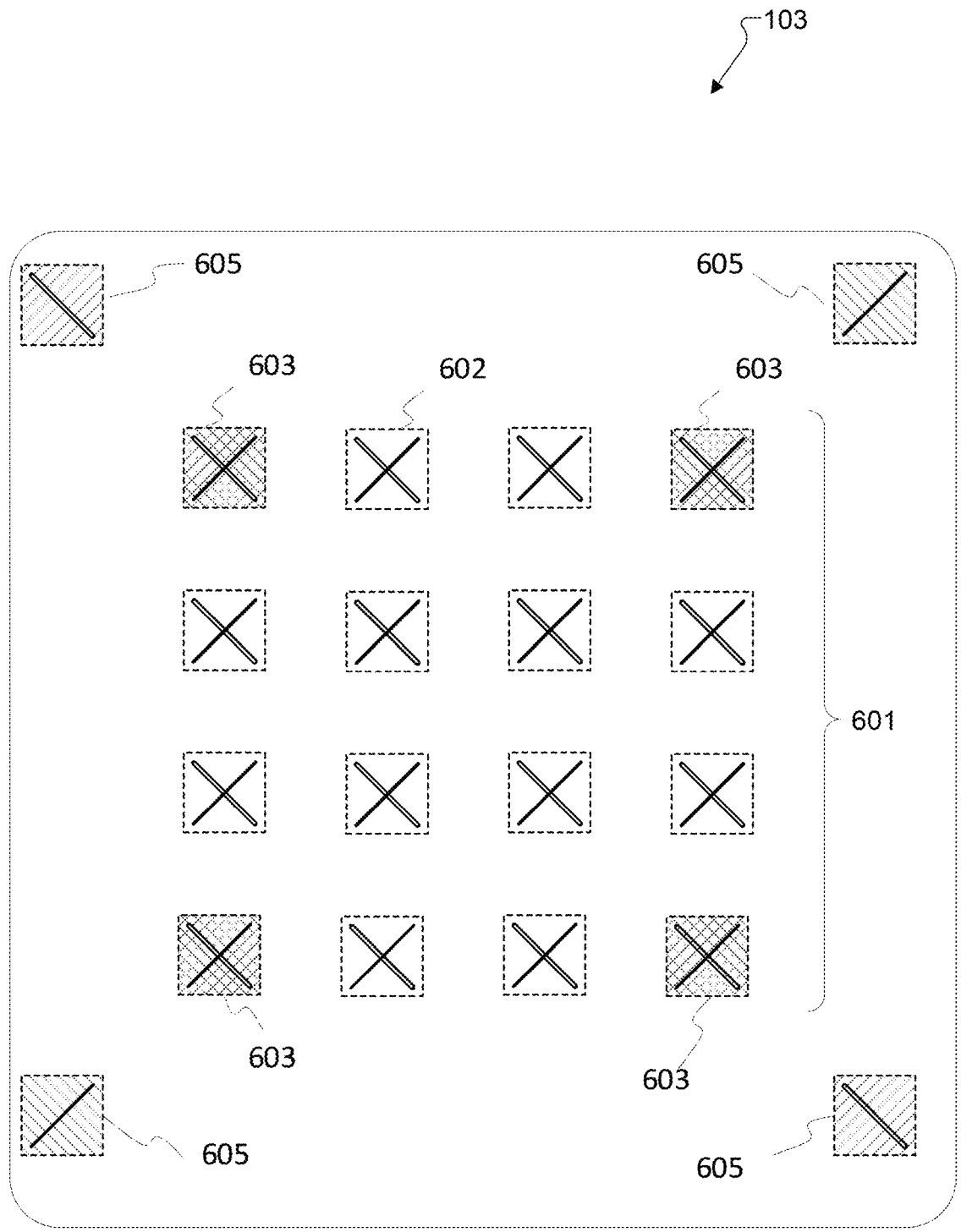

FIG. 6A illustrates a block diagram of an example XDD massive MIMO antenna array 103 according to embodiments of the present disclosure. In this embodiment, dedicated RX antennas, such as antennas 206a-206n of FIG. 2, are placed at the corners of an existing antenna array of common TX and RX antennas, such as antennas 205a-205n of FIG. 2.

The antenna array 103 includes multiple common TX and RX antennas 602 and 603, and multiple dedicated RX antennas 605. The common TX and RX antennas 602 and 603 form an array 601 of common TX and RX antennas for massive MIMO operation. During TDD mode, the common TX and RX antennas 602 and 603 perform both DL TX and UL RX operations in different time slots. During XDD mode, the common TX and RX antennas 602 and 603 only perform DL TX operations.

The dedicated RX antennas 605 perform UL RX operations during XDD mode. In some embodiments, the dedicated RX antennas 605 do not operate during TDD mode, while in other embodiments, the dedicated RX antennas 605 perform UL RX operations during TDD mode alongside the common TX and RX antennas 602 and 603. During XDD mode, the UL RX operations can be performed by the dedicated RX antennas 605 in the same time slots in which the common TX and RX antennas 602 and 603 perform DL TX operations.

As the common TX and RX antennas 603 are the closest antennas of the array 601 to the dedicated RX antennas 605, they are expected to be the largest source of TX leakage during XDD mode. Accordingly, the DL TX signals input to the common TX and RX antennas 603 can be coupled to an interference cancelation process that uses the DL TX signals to generate cancelation signals, which in turn are used to cancel the TX leakage that the common TX and RX antennas 603 cause at dedicated RX antennas 605.

Furthermore, each of the dedicated RX antennas 605 can have an antenna polarization that is in the same direction as the polarization angle of the nearest common TX and RX antenna 603. This provides additional isolation between the dedicated RX antennas 605 and the common TX and RX antennas 603.

Figure 6B:
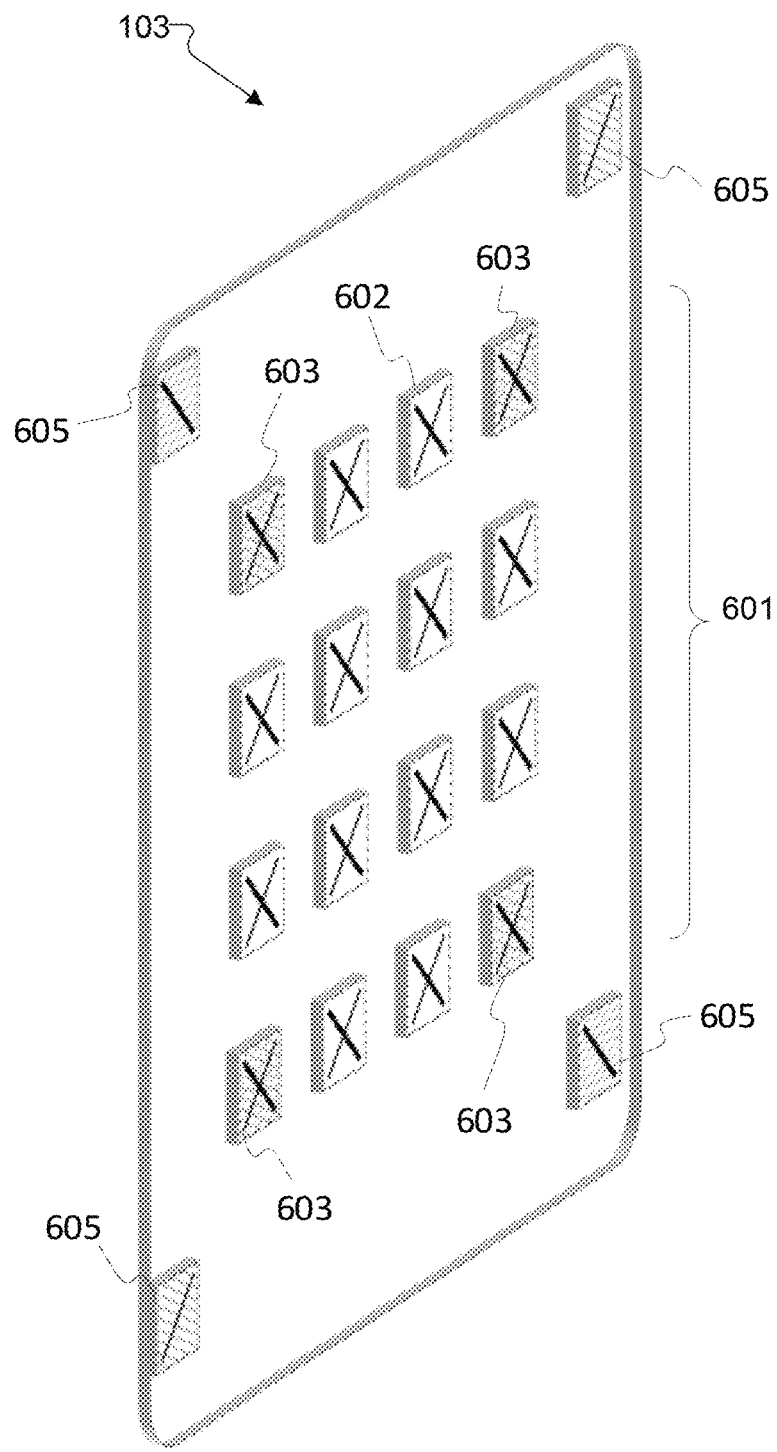

Although FIG. 6A illustrates one example of XDD massive MIMO antenna array 103, various changes may be made to FIG. 6A. For example, various components in FIG. 6A could be combined, further subdivided, or omitted and additional components could be added according to particular needs. FIG. 6B is a rotated three-dimensional view of the block diagram of the example XDD massive MIMO antenna array 103 of FIG. 6A.

Figure 7A:
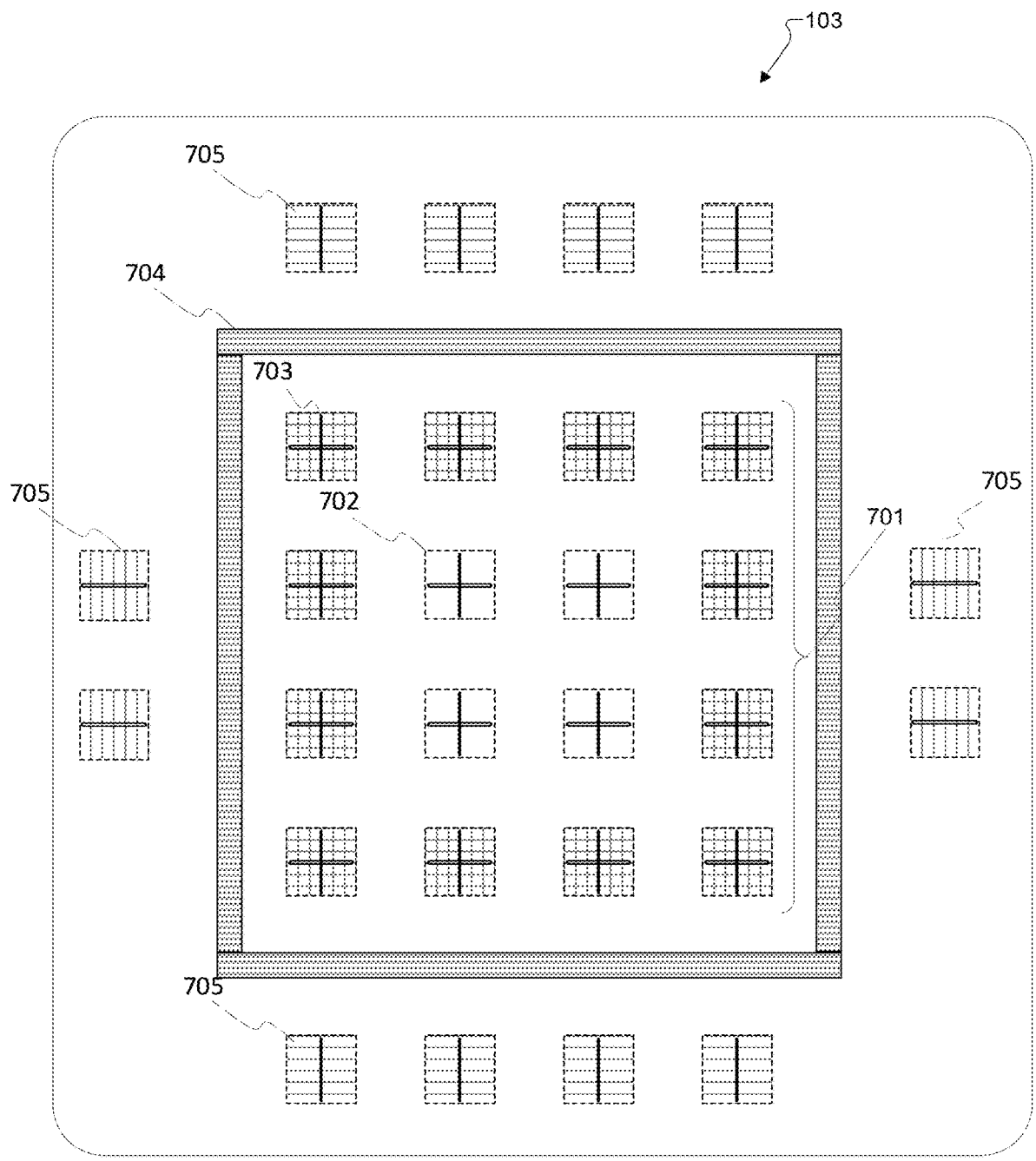

FIG. 7A illustrates a block diagram of an example XDD massive MIMO antenna array 103 according to embodiments of the present disclosure. In this embodiment, dedicated RX antennas, such as antennas 206a-206n of FIG. 2, are placed on all four sides of an existing antenna array of common TX and RX antennas, such as antennas 205a-205n of FIG. 2.

The antenna array 103 includes multiple common TX and RX antennas 702 and 703, EM isolation hardware 704, and multiple dedicated RX antennas 705. The common TX and RX antennas 702 and 703 form an array 701 of common TX and RX antennas for massive MIMO operation. During TDD mode, the common TX and RX antennas 702 and 703 perform both DL TX and UL RX operations in different time slots. During XDD mode, the common TX and RX antennas 702 and 703 only perform DL TX operations.

The dedicated RX antennas 705 perform UL RX operations during XDD mode. In some embodiments, the dedicated RX antennas 705 do not operate during TDD mode, while in other embodiments, the dedicated RX antennas 705 perform UL RX operations during TDD mode alongside the common TX and RX antennas 702 and 703. During XDD mode, the UL RX operations can be performed by the dedicated RX antennas 705 in the same time slots in which the common TX and RX antennas 702 and 703 perform DL TX operations.

The EM isolation hardware 704 provides isolation between the array 701 of common TX and RX antennas and the dedicated RX antennas 705. This at least partially protects the dedicated RX antennas 705 from TX leakage from the common TX and RX antennas 702 and 703 during XDD mode.

As the common TX and RX antennas 703 are the closest antennas of the array 701 to the dedicated RX antennas 705, they are expected to be the largest source of TX leakage during XDD mode. Accordingly, the DL TX signals input to the common TX and RX antennas 703 can be coupled to an interference cancelation process that uses the DL TX signals to generate cancelation signals, which in turn are used to cancel the TX leakage that the common TX and RX antennas 703 cause at dedicated RX antennas 705.

Furthermore, each of the dedicated RX antennas 705 can have an antenna polarization that is in the same direction as the polarization angle of the nearest common TX and RX antenna 703. This provides additional isolation between the dedicated RX antennas 705 and the common TX and RX antennas 703.

Figure 7B:
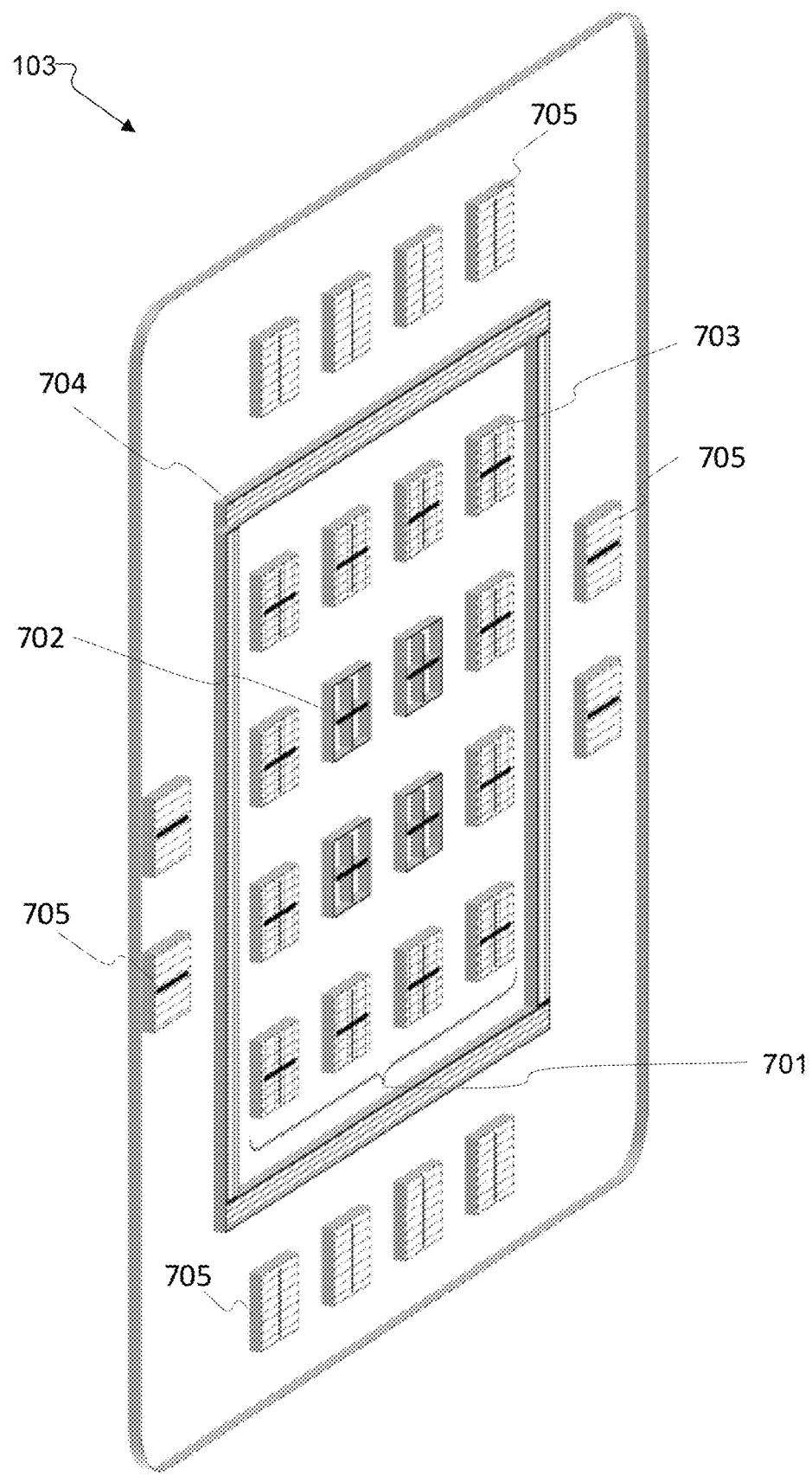

Although FIG. 7A illustrates one example of XDD massive MIMO antenna array 103, various changes may be made to FIG. 7A. For example, various components in FIG. 7A could be combined, further subdivided, or omitted and additional components could be added according to particular needs. FIG. 7B is a rotated three-dimensional view of the block diagram of the example XDD massive MIMO antenna array 103 of FIG. 7A.

Figure 8A:
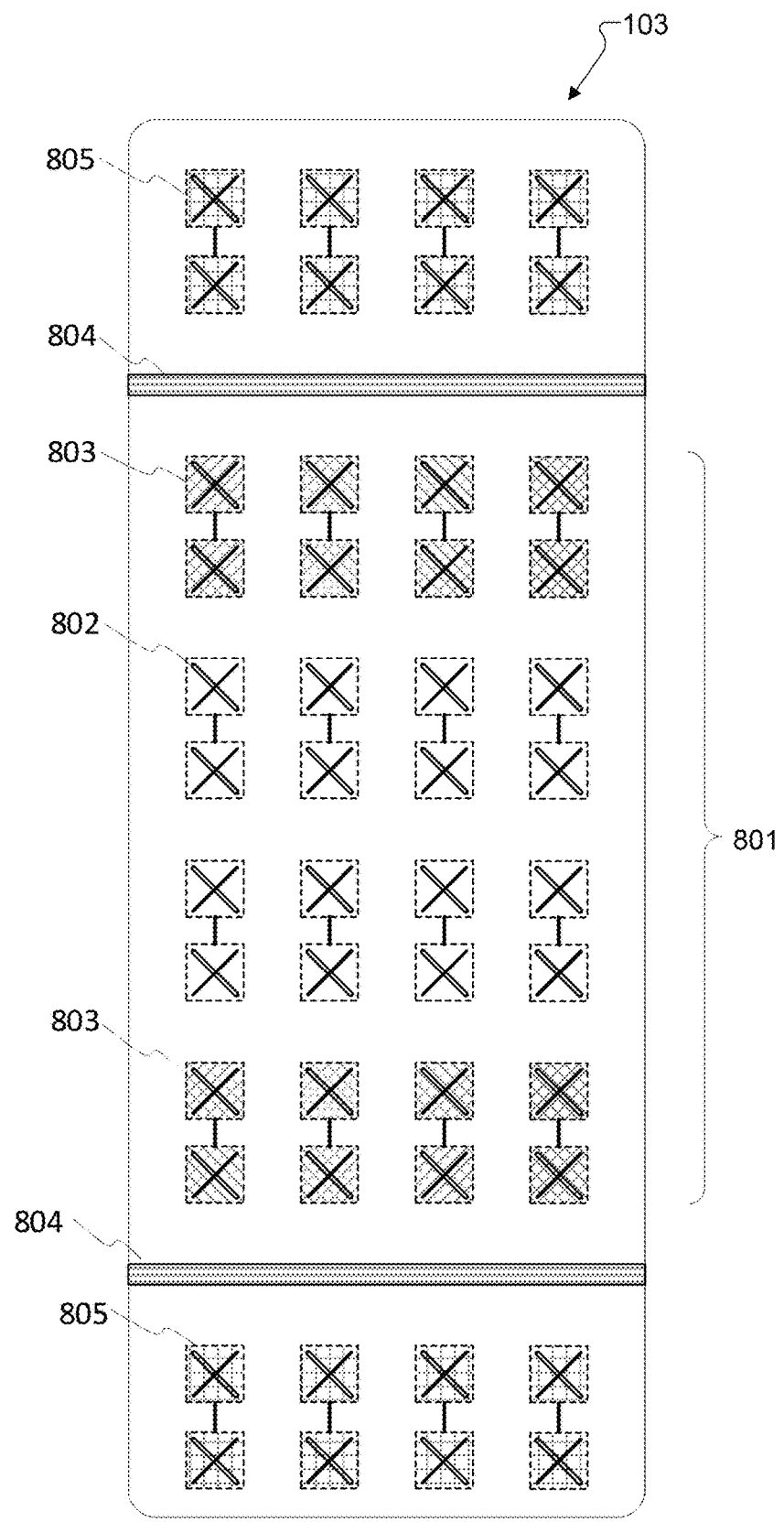

FIG. 8A illustrates a block diagram of an example XDD massive MIMO antenna array 103 according to embodiments of the present disclosure. In this embodiment, dedicated RX antennas, such as antennas 206a-206n of FIG. 2, are arranged in 2×1 sub-array configurations both above and below an existing antenna array of common TX and RX antennas, such as antennas 205a-205n of FIG. 2, and the common TX and RX antennas are also arranged in 2×1 sub-array configuration. It is understood that this is an example, and other sub-array configurations could be used. Antennas in sub-array configuration output the same received signals, and are provided the same transmit signals as inputs.

The antenna array 103 includes multiple common TX and RX antenna sub-arrays 802 and 803, EM isolation hardware 804, and multiple dedicated RX antenna sub-arrays 805. The common TX and RX antenna sub-arrays 802 and 803 form an array 801 of common TX and RX antenna sub-arrays for massive MIMO operation. During TDD mode, the common TX and RX antenna sub-arrays 802 and 803 perform both DL TX and UL RX operations in different time slots. During XDD mode, the common TX and RX antenna sub-arrays 802 and 803 only perform DL TX operations.

The dedicated RX antenna sub-arrays 805 perform UL RX operations during XDD mode. In some embodiments, the dedicated RX antenna sub-arrays 805 do not operate during TDD mode, while in other embodiments, the dedicated RX antenna sub-arrays 805 perform UL RX operations during TDD mode alongside the common TX and RX antenna sub-arrays 802 and 803. During XDD mode, the UL RX operations can be performed by the dedicated RX antenna sub-arrays 805 in the same time slots in which the common TX and RX antenna sub-arrays 802 and 803 perform DL TX operations.

The EM isolation hardware 804 provides isolation between the array 801 of common TX and RX antenna sub-arrays and the dedicated RX antenna sub-arrays 805. This at least partially protects the dedicated RX antenna sub-arrays 805 from TX leakage from the common TX and RX antenna sub-arrays 802 and 803 during XDD mode.

As the common TX and RX antenna sub-arrays 803 are the closest antenna sub-arrays of the array 801 to the dedicated RX antenna sub-arrays 805, they are expected to be the largest source of TX leakage during XDD mode. Accordingly, the DL TX signals input to the common TX and RX antenna sub-arrays 803 can be coupled to an interference cancelation process that uses the DL TX signals to generate cancelation signals, which in turn are used to cancel the TX leakage that the common TX and RX antenna sub-arrays 803 cause at dedicated RX antenna sub-arrays 805.

Figure 8B:
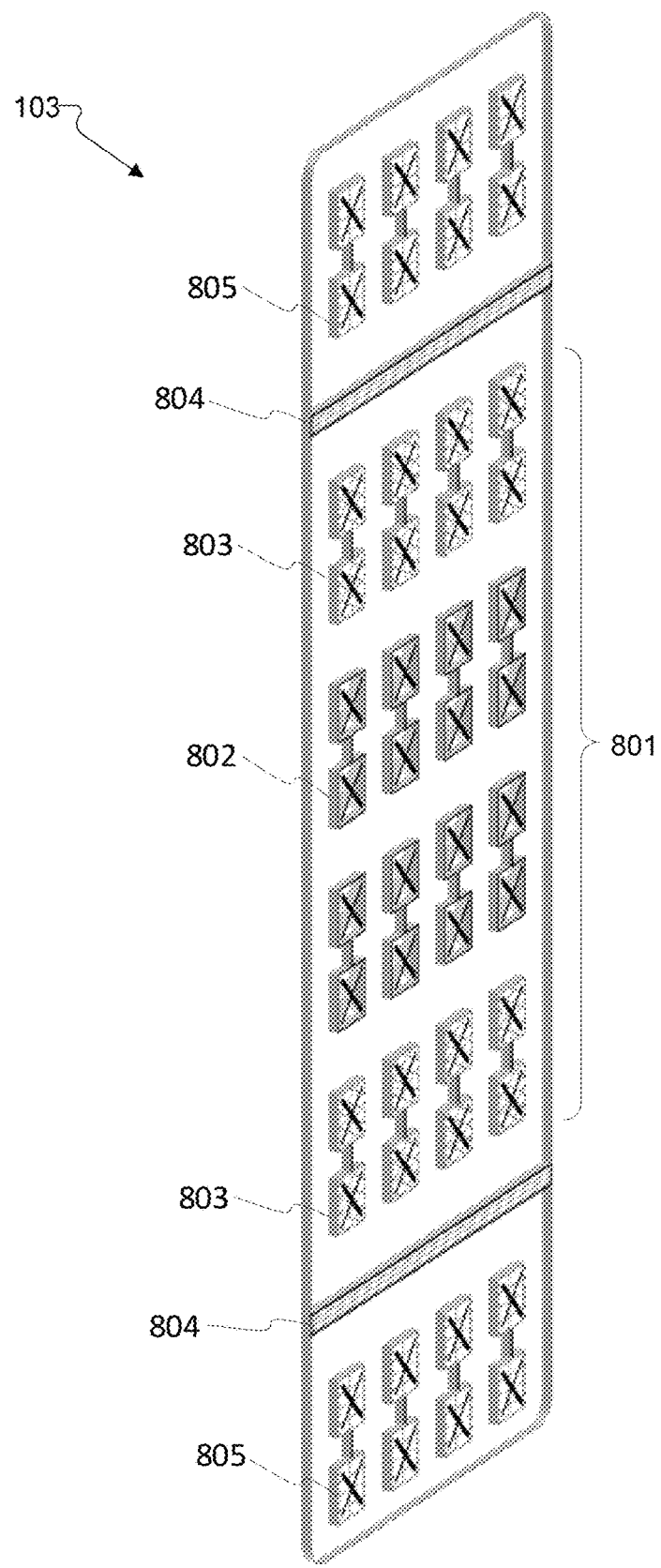

Although FIG. 8A illustrates one example of XDD massive MIMO antenna array 103, various changes may be made to FIG. 8A. For example, various components in FIG. 8A could be combined, further subdivided, or omitted and additional components could be added according to particular needs. FIG. 8B is a rotated three-dimensional view of the block diagram of the example XDD massive MIMO antenna array 103 of FIG. 8A.

FIG. 9A illustrates a block diagram of an example XDD operation 900 according to embodiments of the present disclosure. In some embodiments, the XDD operation 900 can be performed by the BS 102 of FIGS. 1-2. The XDD operation 900 could be performed using any of the XDD massive MIMO antenna arrays 103 of FIGS. 3A-8B. FIG. 9B illustrates example frequency spectrum diagrams 910-913 of signals at various points in the XDD operation 900 of FIG. 9A.

The example XDD operation 900 includes a signal processing unit 901, a TX analog signal chain 902, a coupler 903, a TX/RX switch 904, a common TX and RX antenna 905, a dedicated RX antenna 906, and three RX analog signal chains: RX analog signal chain 907, RX analog signal chain 908, and RX analog signal chain 909. The common TX and RX antenna 905 and the dedicated RX antenna 906 are part of the XDD massive MIMO array 103 of FIGS. 1-8.

The signal processing unit 901 includes TX and RX processing chains and interference cancelation processes. In some embodiments, the interference cancelation processes could be SIC processes. The interference cancelation processes can be referred to as TX leakage cancelation processes, as TX leakage is the target of cancelation in this embodiment. In some embodiments, the signal processing unit 901 is implemented in controller/processor 225 of BS 102, or in RF transceivers 210a-210n or RX processing circuitry 220 of BS 102.

The TX analog signal chain 902 receives a signal TX1 from the signal processing unit 901, and generates a TX signal (TX1_out) from TX1 for output from the common TX and RX antenna 905. The TX analog signal chain 902 can include components such as a power amplifier (PA), as well as any other suitable components used for generating RF output signals. The TX analog signal chain 902 could be implemented in part in each of the TX processing circuitry 215 and the RF transceivers 210a-210n.

The PA is nonlinear, and as a result it generates a TX leakage signal in frequency allocations adjacent to the DL TX frequency allocation. This is illustrated in frequency spectrum diagrams 910 and 911 of FIG. 9B, which represent the frequency spectra of the input and output, respectively, of the TX signal chain 902. As illustrated, TX leakage 914 is introduced in the output of the TX signal chain 902. In TDD mode this TX leakage may not be concerning, as the frequency allocations adjacent to the DL TX frequency allocation are not in use by the BS 102. In XDD mode, however, the frequency allocations adjacent to the DL TX frequency allocation may correspond to the UL RX frequency allocation, in which case the TX leakage is interference with the UL RX signal that corresponds to the signal RX2, discussed below.

The coupler 903 samples a small portion of the signal TX1_out that is output from the TX analog signal chain 902, and inputs it to the RX analog signal chain 909. The sampled signal output by the coupler 903 can be referred to as a sense signal of the TX1_out signal. The RX analog signal chain 909, in turn, performs any analog processing and signal conditioning needed before outputting a signal RX_aux to the signal processing unit 901 for use in generating an interference cancelation signal. As illustrated in frequency spectrum diagram 912 of FIG. 9B, RX_aux is a replica of TX1_out at lower power. The interference cancelation signal is combined with the RX2 signal, discussed below, to cancel the TX leakage that will be caused by the TX1_out signal in the RX2 signal in XDD mode.

The TX/RX switch 904 receives, from the coupler 903, the remainder of the power of the TX1_out signal after the sample is taken to form the RX_aux signal. In some embodiments, the coupler 903 samples about 1% of the total power of the TX1_out signal, while the remaining 99% of the power of the TX1_out signal is passed on to the TX/RX switch 904. In TDD mode, the TX/RX switch 904 switches as necessary to connect the common TX and RX antenna 905 to either the TX signal chain 902 or the RX signal chain 907. More specifically, during DL TX time slots in TDD mode, the TX/RX switch 904 connects the TX analog signal chain 902 to the common TX and RX antenna 905, and during UL RX time slots in TDD mode, the TX/RX switch 904 connects the common TX and RX antenna 905 to the RX analog signal chain 908. In XDD mode, the TX/RX switch 904 only connects the common TX and RX antenna 905 to the TX analog signal chain 902, as the common TX and RX antenna 905 is only used for transmission in XDD mode.

The common TX and RX antenna 905 is used for massive MIMO operations. For example, the common TX and RX antenna 905 can be one of antennas 205a-205n of BS 102 in FIG. 2, and can be part of an array of common TX and RX antennas or antenna elements, such as the arrays 301, 401, 501, 601, 701, or 801 of FIGS. 3A-8B. In this embodiment, one antenna with one polarization is shown, but it is understood that this is for purposes of illustration only, and the XDD operation 900 can include any number of common TX and RX antennas 905 with corresponding TX chain and RX chain components 902, 903, 904, 908, and 909.

In XDD mode, the common TX and RX antenna 905 receives the TX1_out signal from the TX/RX switch 904 and radiates the TX1_out signal. Although the intended recipient of the TX1_out signal is, e.g., a UE 104 of FIG. 1A, the TX1_out signal will also leak into the dedicated RX antenna 906 via over-the-air coupling.

The dedicated RX antenna 906 can be, for example, one of the antennas 206a-206n of BS 102 of FIG. 2, and can be one of the dedicated RX antennas or antenna elements 305, 405, 505, 605, 705, or 805 of FIGS. 3A-8B. In this embodiment, one antenna is shown, which has the same polarization angle as the common TX and RX antenna 905. It is understood that this is for purposes of illustration only, and the XDD operation 900 can include any number of dedicated RX antennas 906 with corresponding RX chain components 907.

RX analog signal chain 907 receives a UL RX signal from the dedicated RX antenna 906 and performs any analog processing and signal conditioning needed before outputting a signal RX2 to the signal processing unit 901, which can contain RX processing chains, as described above. The UL RX signal includes interference caused by TX leakage of the DL TX signal, TX1_out, as described above. This is illustrated in the spectrum diagram 913 of FIG. 9B, which shows that TX leakage 914 is in the same frequency allocation as the desired UL RX signal 915. In this embodiment, the DL TX signal components, including the TX leakage 914, are partially attenuated in the UL RX signal due to antenna isolation (e.g., isolation due to physical spacing or due to EM isolation hardware).

In some embodiments, the signal processing unit 901 uses the RX_aux signal to generate a cancelation signal which is applied to the RX2 signal to reduce or entirely cancel the TX leakage out of the RX2 signal. In other embodiments, EM isolation hardware, such as EM isolation hardware 304, 404, 504, 704, or 804 is placed between the common TX and RX antenna 905 and the dedicated RX antenna 906 to reduce the amount of TX leakage that is contained in RX2. In yet other embodiments, physical spacing between the common TX and RX antenna 905 and the dedicated RX antenna 906 within the XDD massive MIMO antenna array 103 reduces the amount of TX leakage that is contained in RX2. Any of these embodiments can be combined with each other to reduce the TX leakage below an RX noise floor so that the RX process is not affected by the TX leakage.

Although FIG. 9A illustrates one example of an XDD operation 900, various changes may be made to FIG. 9A. For example, various components in FIG. 9A could be combined, further subdivided, or omitted and additional components could be added according to particular needs.

Figure 10:
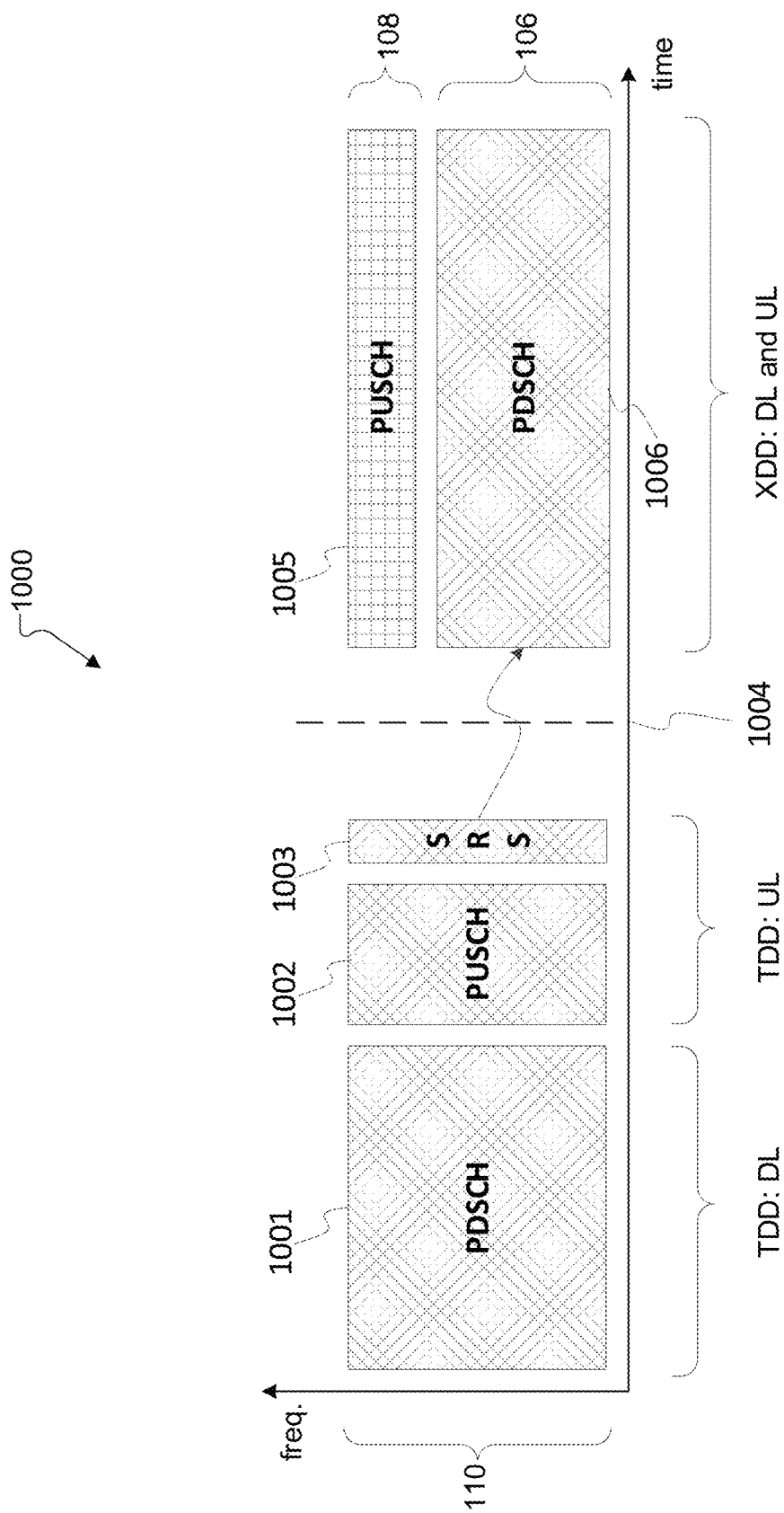
FIG. 10 illustrates a time-frequency diagram of example TDD and XDD modes of a BS according to embodiments of the present disclosure.

FIG. 10 illustrates a time-frequency diagram 1000 of example TDD and XDD modes of a BS according to embodiments of the present disclosure. In some embodiments, time-frequency diagram 1000 represents TDD and XDD modes performed by the BS 102 of FIGS. 1A-2. The TDD and XDD modes could be performed using any of the XDD massive MIMO antenna arrays 103 of FIGS. 3A-8B. The XDD mode could be performed as disclosed above with respect to the XDD operation 900 of FIG. 9.

In TDD mode, a physical downlink shared channel (PDSCH) 1001 is transmitted with up to full band frequency allocation of TDD band 110, and with MU-MIMO capability, in TDD DL time slots. The PDSCH 1001 is transmitted by common TX and RX antennas of the XDD massive MIMO antenna array 103. These could be, for example, antennas 205a-205n of BS 102 in FIG. 2, as represented by common TX and RX antenna 905 in FIG. 9A, and can be part of an array of common TX and RX antennas or antenna elements, such as the arrays 301, 401, 501, 601, 701, or 801 of FIGS. 3A-8B.

Next, in TDD mode, physical uplink shared channel (PUSCH) 1002 is received with up to full band frequency allocation of TDD band 110 in TDD UL time slots. The PUSCH signals can be received by common TX and RX antennas and dedicated RX antennas of the XDD massive MIMO antenna array 103. The dedicated RX antennas could be, for example, antennas 206a-206n of BS 102 in FIG. 2, as represented by dedicated RX antenna 906 in FIG. 9A, and can be part of antennas or antenna elements 305, 405, 505, 605, 705, or 805, of FIGS. 3A-8B. In some embodiments, only the common TX and RX antennas receive the PUSCH in TDD mode, while the dedicated RX antennas are dormant. Typically, a subset of signals received by multiple antennas is used for PUSCH processing.

Next, still in TDD mode, a UL sounding reference signal (SRS) is received by the common TX and RX antennas of the XDD massive MIMO antenna array 103 in the TDD UL time slots. Again, the SRS is received with up to full band frequency allocation of TDD band 110. The UL SRS is used for TDD beamforming operations, and its reception by common TX and RX antennas allows UL-DL reciprocity to be exploited for beamforming of DL signals. That is, because the UL channels of the common TX and RX antennas are substantially the same as their DL channels, channel information gained from the received UL SRS can be exploited for DL beamforming of DL signals transmitted by those same common TX and RX antennas.

At time 1004 time-frequency diagram 1000, the system transitions to XDD mode. In XDD mode, UL reception of PUSCH 1005 and DL transmission of PDSCH 1006 occur simultaneously. The PUSCH 1005 is received by the dedicated RX antennas, and the PDSCH 1006 is transmitted by the common TX and RX antennas. The DL transmission of PDSCH 1006 has a DL frequency allocation (e.g., DL spectrum 106 of FIG. 1A) that is less than the entire TDD band 110 to allow uplink UL reception in a nearby or adjacent frequency allocation (e.g., UL spectrum 108 of FIG. 1A) within the TDD band 110.

In this embodiment, the DL transmission of PDSCH 1006 in XDD mode is able to exploit the MU-MIMO beamforming enabled by reception of the UL SRS 1003 in TDD mode. This is possible because the PDSCH 1006 is transmitted in XDD mode by the same common TX and RX antennas that perform UL RX of the UL SRS 1003 in TDD mode, and therefore the UL-DL reciprocity is maintained at these antennas in XDD mode.

Although FIG. 10 illustrates one example time-frequency diagram 1000 of TDD and XDD modes, various changes may be made to FIG. 10. For example, additional signals could be transmitted or received, or signals could be omitted from FIG. 10.

Figure 11:
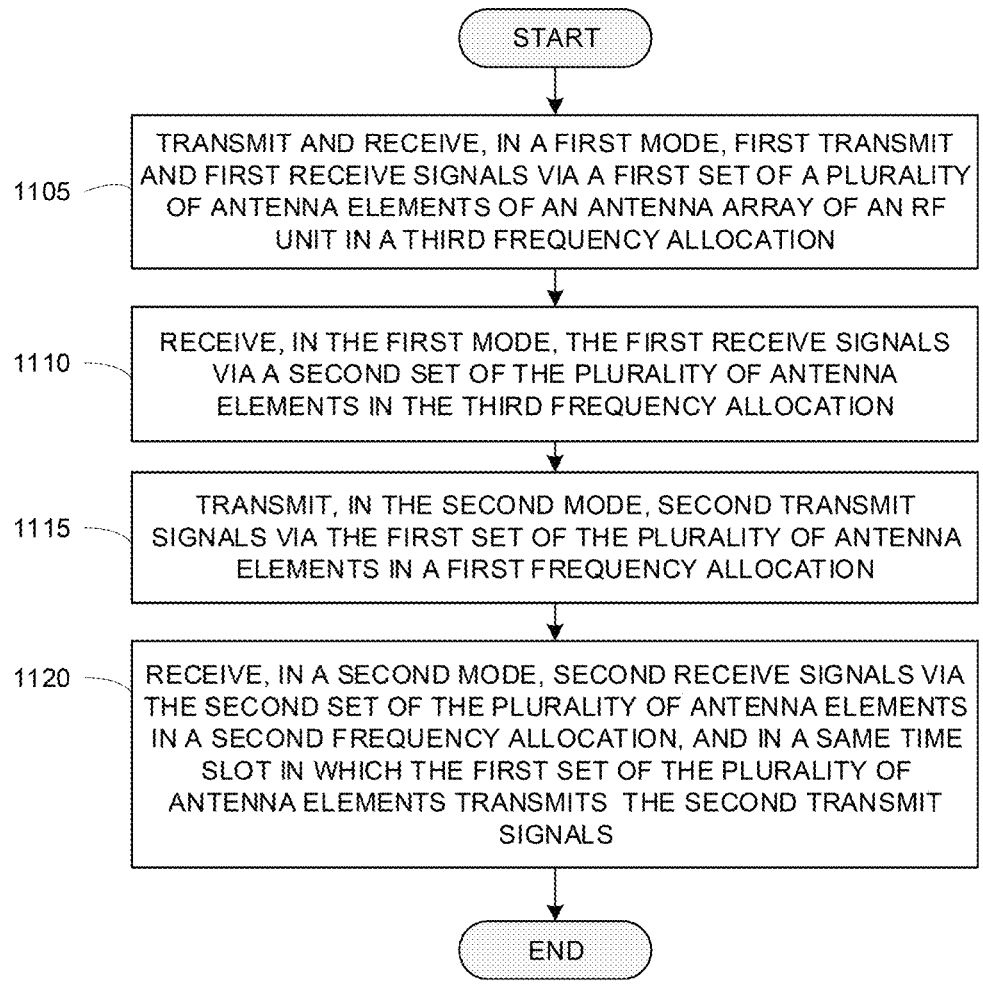
FIG. 11 illustrates a process for operating a RF unit in accordance with various embodiments of the present disclosure.

FIG. 11 illustrates a process for operating a RF unit in accordance with various embodiments of the present disclosure. For example, the process depicted in FIG. 11 may be performed by a BS 102 of FIGS. 1-2, and may use a XDD massive MIMO antenna array 103 of any of FIGS. 3A-8B, and may include TDD and XDD mode operations as disclosed in FIGS. 9-10.

The RF unit that performs the process of FIG. 11 comprises an antenna array, such as an XDD massive MIMO antenna array 103 of BS 102, which comprises a plurality of antenna elements. A first set of the antenna elements is, for example, the common TX and RX antennas 205a-205n of BS 102, as represented by the common TX and RX antenna 905 in FIG. 9A. The first set of the antenna elements can be arranged as a massive MIMO array, such as the arrays 301, 401, 501, 601, 701, or 801 of FIGS. 3A-8B. A second set of the antenna elements is, for example, the dedicated RX antennas 206a-206n of BS 102, as represented by dedicated RX antenna 906 in FIG. 9A.

The second set of the antenna elements can be disposed, in various configurations, adjacent to at least one edge of the massive MIMO array of the first set of the antenna elements, as illustrated by antenna elements 305, 405, 505, 605, 705, or 805 of FIGS. 3A-8B. Some or all of the antenna elements of the RF unit can be arranged in a sub-array configuration, as illustrated in FIGS. 8A-8B. An EM isolation element (or EM isolation hardware) can be disposed between the first and second sets of the antenna elements. This could be, for example, EM isolation hardware 304, 404, 504, 704, or 804 of FIGS. 3A-5B and 7A-8B.

The RF unit is configured to operate in two modes. The first mode is a TDD mode, and the second mode is an XDD mode. The first set of the antenna elements is configured to transmit and receive in the first mode, and to only transmit in the second mode. The second set of antenna elements is configured to only receive in both modes. In some embodiments, the second set of antenna elements only operates in the second mode, and is dormant in the first mode.

In the second mode, transmit signals transmitted by the first set of antenna elements are transmitted in a first frequency allocation, and receive signals received by the second set of antenna elements are received in a second frequency allocation. The first and second frequency allocations can overlap, can be adjacent and non-overlapping, or can be non-overlapping with a frequency band gap between them. The relative sizes of the first and second frequency allocations can be dynamically changed between time slots in the second mode. In the first mode, both the transmit and receive signals that are transmitted and received by the first set of antenna elements are allocated a third frequency allocation, which can comprise both the first and second frequency allocations. The third frequency allocation can be a TDD band, and the first and second frequency allocations are subsets of the TDD band.

The process begins by transmitting and receiving, in the first mode, first transmit and first receive signals via the first set of the plurality of antenna elements of the antenna array of the RF unit (step 1105). The transmission and reception of step 1105 occurs in the third frequency allocation. For example, in step 1105, the common TX and RX antennas transmit and receive, respectively, TDD DL and UL signals in a TDD band. The TDD DL signals can include, for example, a PDSCH, and the TDD UL signals can include, for example, a PUSCH or a UL SRS. The transmission of TDD DL signals by the first set of antennas occurs in a TDD DL time slot, while the reception of TDD UL signals by the first set of antennas occurs in a TDD UL time slot.

In some embodiments, the process continues by receiving, in the first mode, the first receive signals via the second set of the plurality of antenna elements of the antenna array of the RF unit (step 1110). The reception of step 1110 occurs in the third frequency allocation. For example, in step 1110, the dedicated RX antennas receive TDD UL signals in the TDD band. The TDD UL signals received by the second set of antennas can include, for example, the PUSCH. The reception of TDD UL signals by the second set of antennas in the TDD mode occurs in the TDD UL time slot.

The process continues by transmitting, in the second mode, second transmit signals via the first set of the plurality of antenna elements (step 1115). The transmission of step 1115 occurs in the first frequency allocation. For example, in step 1115, the common TX and RX antennas transmit XDD DL signals in a subset of the TDD band that corresponds to a DL allocation. The XDD DL signals can include, for example, a PDSCH. The XDD DL signals can be beamformed signals using beamforming that is based on the UL SRS received in step 1105. This is possible because UL-DL reciprocity is maintained between the TDD and XDD modes by the use of the common TX and RX antennas for UL reception of the UL SRS in the TDD mode and for DL transmission in the XDD mode.

The process continues by receiving, in the second mode, second receive signals via the second set of the plurality of antenna elements (step 1120). The reception of step 1120 occurs in the second frequency allocation. For example, in step 1120, the dedicated RX antennas receive XDD UL signals in a subset of the TDD band that corresponds to a UL allocation. The XDD UL signals can include, for example, a PUSCH.

Steps 1115 and 1120 occur during the same time slot or time slots. For example, steps 1115 and 1120 occur during XDD time slots. This is facilitated by the use of different frequency allocations for the XDD DL transmission and XDD UL reception. As discussed above, some interference can occur in the received XDD UL signal due to the simultaneous transmission of the XDD DL signal. This interference can be reduced by physical spacing of the first and second sets of antenna elements, by EM isolation hardware disposed between the first and second sets of antenna elements, by interference cancelation processing based on sensing the XDD DL signal, or by a combination of the above.

The above flowchart illustrates an example method that can be implemented in accordance with the principles of the present disclosure and various changes could be made to the method illustrated in the flowchart herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A radio frequency (RF) unit comprising:
an antenna array comprising a plurality of antenna elements, wherein:
a first set of the plurality of antenna elements is configured to operate in a Time Division Duplex (TDD) mode in a frequency band,
a second set of the plurality of antenna elements is configured to operate in an enhanced duplexing mode in the frequency band,
in the TDD mode, the first set of the plurality of antenna elements is configured to transmit and receive in the frequency band, and
in the enhanced duplexing mode:
the first set of the plurality of antenna elements is configured to transmit and not receive in the frequency band; and
the second set of the plurality of antenna elements is configured to receive in the frequency band in a same time slot in which the first set of the plurality of antenna elements is configured to transmit in the frequency band.

2. The RF unit of claim 1, wherein:
the second set of the plurality of antenna elements is further configured to operate in the TDD mode, and
in the TDD mode, the second set of the plurality of antenna elements is configured to receive and not transmit.

3. The RF unit of claim 1, wherein:
in the enhanced duplexing mode, the first set of the plurality of antenna elements is configured to transmit in a first frequency allocation,
in the enhanced duplexing mode, the second set of the plurality of antenna elements is configured to receive in a second frequency allocation, and
the first frequency allocation and the second frequency allocation are non-overlapping.

4. The RF unit of claim 3, wherein:
the first frequency allocation and the second frequency allocation comprise a third frequency allocation, and
in the TDD mode, the first set of the plurality of antenna elements is configured to transmit and receive in the third frequency allocation.

5. The RF unit of claim 3, wherein a size of the first frequency allocation and a size of the second frequency allocation are configurable between time slots.

6. The RF unit of claim 1, wherein the first set of the plurality of antenna elements is further configured to:
in the TDD mode, receive a sounding reference signal (SRS) in a first time slot,
in the enhanced duplexing mode, transmit in a second time slot a beamformed signal that is based on the received SRS.

7. The RF unit of claim 1, wherein:
the first set of the plurality of antenna elements are common transmit and receive antennas that comprise a massive multiple-input multiple-output (MIMO) array, and
the RF unit further comprises:
a plurality of couplers, each configured to sample a transmit signal from one of the common transmit and receive antennas; and
a processor operably connected to the plurality of couplers and configured to perform interference cancelation based on the sampled transmit signals.

8. The RF unit of claim 1, wherein:
the first set of the plurality of antenna elements comprises a massive multiple-input multiple-output (MIMO) array, and
the antenna elements comprising the second set of the plurality of antenna elements are disposed adjacent to at least one edge of the massive MIMO array.

9. The RF unit of claim 1, wherein:
in the enhanced duplexing mode, the first set of the plurality of antenna elements is configured to transmit in a first frequency allocation,
in the enhanced duplexing mode, the second set of the plurality of antenna elements is configured to receive in a second frequency allocation, and
the first frequency allocation and the second frequency allocation are overlapping.

10. A method of operation of a radio frequency (RF) unit, comprising:
transmitting and receiving, in a Time Division Duplex (TDD) mode, first transmit and first receive signals in a frequency band via a first set of a plurality of antenna elements of an antenna array of the RF unit; and
in an enhanced duplexing mode:
transmitting second transmit signals in the frequency band via the first set of the plurality of antenna elements, and
receiving second receive signals in the frequency band via a second set of the plurality of antenna elements of the antenna array of the RF unit in a same time slot in which the first set of the plurality of antenna elements transmits the second transmit signals in the frequency band.

11. The method of claim 10, further comprising:
receiving, in the TDD mode, at least some of the first receive signals via the second set of the plurality of antenna elements.

12. The method of claim 10, further comprising:
transmitting, in the enhanced duplexing mode, the second transmit signals via the first set of the plurality of antenna elements in a first frequency allocation; and
receiving, in the enhanced duplexing mode, the second receive signals via the second set of the plurality of antenna elements in a second frequency allocation,
wherein the first frequency allocation and the second frequency allocation are non-overlapping.

13. The method of claim 12, wherein the first frequency allocation and the second frequency allocation comprise a third frequency allocation, the method further comprising transmitting and receiving, in the TDD mode, the first transmit and receive signals via the first set of the plurality of antenna elements in the third frequency allocation.

14. The method of claim 12, wherein a size of the first frequency allocation and a size of the second frequency allocation are configurable between time slots.

15. The method of claim 10, further comprising:
receiving, via the first set of the plurality of antenna elements, in the TDD mode, a sounding reference signal (SRS) in a first time slot; and
transmitting, via the first set of the plurality of antenna elements, in the enhanced duplexing mode, in a second time slot, a beamformed signal that is based on the received SRS.

16. The method of claim 10, wherein:
the first set of the plurality of antenna elements are common transmit and receive antennas that comprise a massive multiple-input multiple-output (MIMO) array, and
the method further comprises:
sampling a transmit signal from the common transmit and receive antennas; and
performing interference cancelation based on the sampled transmit signals.

17. The method of claim 10, wherein:
the first set of the plurality of antenna elements comprises a massive multiple-input multiple-output (MIMO) array, and
the antenna elements comprising the second set of the plurality of antenna elements are disposed adjacent to at least one edge of the massive MIMO array in the RF unit.

18. The method of claim 10, further comprising:
transmitting, in the enhanced duplexing mode, the second transmit signals via the first set of the plurality of antenna elements in a first frequency allocation; and
receiving, in the enhanced duplexing mode, the second receive signals via the second set of the plurality of antenna elements in a second frequency allocation,
wherein the first frequency allocation and the second frequency allocation overlapping.

* * * * *